US009395856B2

(12) United States Patent
Iizuka

(10) Patent No.: US 9,395,856 B2
(45) Date of Patent: Jul. 19, 2016

(54) LINEAR SYSTEM COEFFICIENT ESTIMATING METHOD, INTEGRATED CIRCUIT, AND ELECTRONIC DEVICE

(75) Inventor: Kunihiko Iizuka, Osaka (JP)

(73) Assignee: Sharp Kabushiki Kaishi, Osaka-shi (JP)

( * ) Notice: Subject to any disclaimer, the term of this patent is extended or adjusted under 35 U.S.C. 154(b) by 230 days.

(21) Appl. No.: 14/112,844

(22) PCT Filed: Jan. 18, 2012

(86) PCT No.: PCT/JP2012/050918
§ 371 (c)(1),
(2), (4) Date: Oct. 18, 2013

(87) PCT Pub. No.: WO2012/160839
PCT Pub. Date: Nov. 29, 2012

(65) Prior Publication Data
US 2014/0035874 A1     Feb. 6, 2014

(30) Foreign Application Priority Data

May 25, 2011  (JP) .................................. 2011-117385

(51) Int. Cl.
*G06F 3/044* (2006.01)
*G06F 3/041* (2006.01)
(52) U.S. Cl.
CPC .............. *G06F 3/044* (2013.01); *G06F 3/0416* (2013.01)
(58) Field of Classification Search
CPC ...................................................... G06F 3/044
USPC .......................................................... 345/174
See application file for complete search history.

(56) References Cited

U.S. PATENT DOCUMENTS

2006/0158202 A1   7/2006  Umeda et al.
2009/0195517 A1   8/2009  Duheille et al.
(Continued)

FOREIGN PATENT DOCUMENTS

JP    2009-181570 A    8/2009
JP        4364609 B2   11/2009
(Continued)

*Primary Examiner* — Amare Mengistu
*Assistant Examiner* — Joseph G Rodriguez
(74) *Attorney, Agent, or Firm* — Birch, Stewart, Kolasch & Birch, LLP

(57) ABSTRACT

A touch panel controller (3) capable of accurately detecting a change in capacitance includes: a driving section (4) which drives capacitors (C1 through CM) in parallel in accordance with N M-dimensional vectors; and an estimating section (5) which obtains linear sums of the capacitors (C1 through CM) in accordance with the driving in parallel and estimates values of the capacitors (C1 through CM) based on an inner product operation carried out with respect to (i) the linear sums of the capacitors (C1 through CM) and (ii) the N M-dimensional vectors, the driving section (4) driving the capacitors (C1 through CM) in parallel in a first order of the N M-dimensional vectors, the estimating section (5) estimating a first estimated value of the capacitors (C1 through CM) in accordance with the driving in parallel in the first order, the driving section (4) driving the capacitors (C1 through CM) in parallel in a second order of the N M-dimensional vectors, the estimating section (5) estimating a second estimated value of the capacitors (C1 through CM) in accordance with the driving in parallel in the second order, and the touch panel controller (3) further including an averaging section (17) estimating the values of the capacitors (C1 through CM) by averaging the first estimated value and the second estimated value.

11 Claims, 22 Drawing Sheets

(56) References Cited

U.S. PATENT DOCUMENTS

| | | |
|---|---|---|
| 2010/0321331 A1 | 12/2010 | Oda et al. |
| 2011/0043478 A1* | 2/2011 | Matsushima ................. 345/174 |
| 2011/0055305 A1 | 3/2011 | Matsushima |

FOREIGN PATENT DOCUMENTS

| | | |
|---|---|---|
| JP | 2011-3036 A | 1/2011 |
| JP | 2011-47774 A | 3/2011 |
| WO | WO 2009/107415 A1 | 9/2009 |

* cited by examiner

(a)
$$\begin{pmatrix} V1 \\ V2 \\ V3 \\ \vdots \\ VM \\ \vdots \\ VN \end{pmatrix} = -(V/Cf) \; H \begin{pmatrix} C1 \\ C2 \\ C3 \\ \vdots \\ CM \end{pmatrix} \quad \cdots (\text{EQUATION 9})$$

(b)
$$Eb \begin{pmatrix} C1 \\ C2 \\ C3 \\ \vdots \\ CM \end{pmatrix} = \begin{pmatrix} C1b \\ C2b \\ C3b \\ \vdots \\ CMb \end{pmatrix} = -(Cf/V) \; F \begin{pmatrix} V1 \\ V2 \\ V3 \\ \vdots \\ VM \\ \vdots \\ VN \end{pmatrix} \quad \cdots (\text{EQUATION 10})$$

F I G. 4

F I G. 14
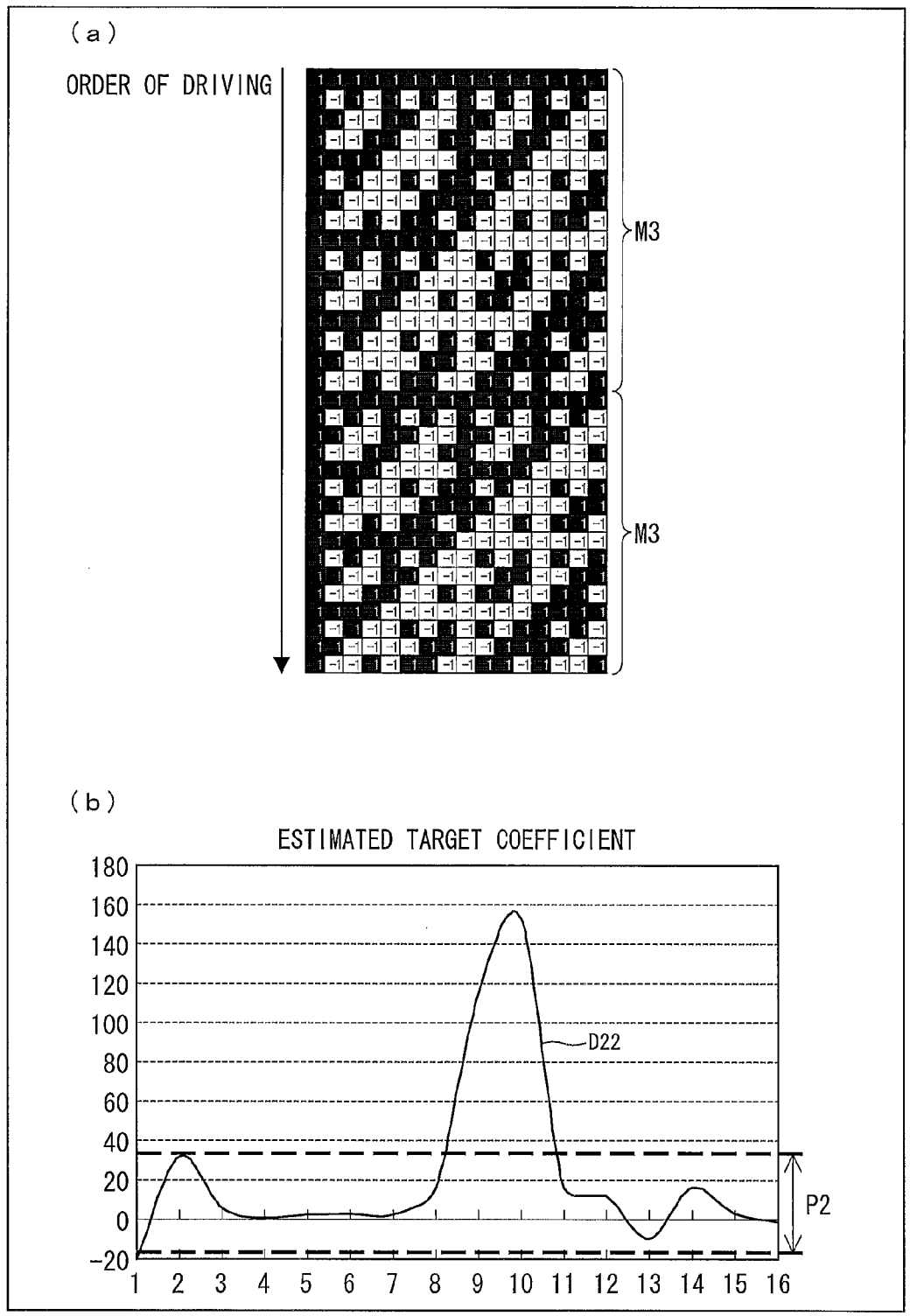

F I G. 1 6
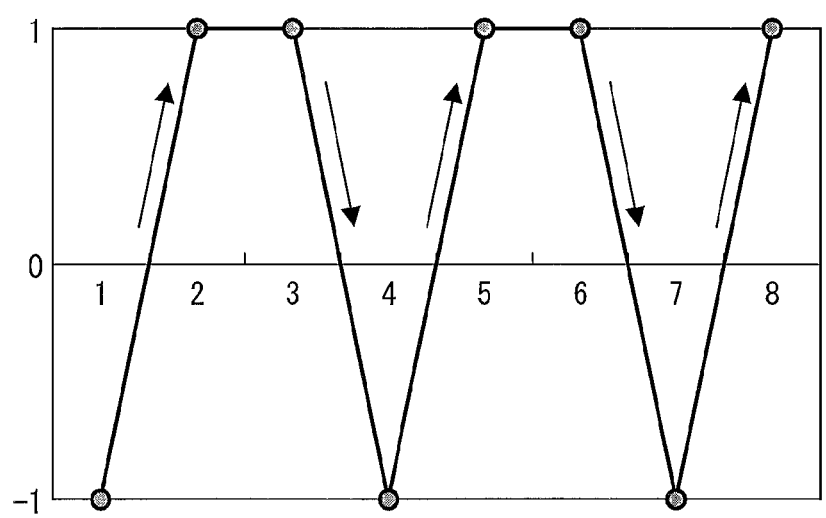

F I G. 1 8

$$M6 = \sqrt{\frac{1}{2}} \begin{pmatrix} \sqrt{\frac{1}{2}} & \sqrt{\frac{1}{2}} & \sqrt{\frac{1}{2}} & \sqrt{\frac{1}{2}} & \sqrt{\frac{1}{2}} & \sqrt{\frac{1}{2}} & \sqrt{\frac{1}{2}} & \sqrt{\frac{1}{2}} \\ \cos\left(\frac{\pi}{16}\right) & \cos\left(\frac{3\pi}{16}\right) & \cos\left(\frac{5\pi}{16}\right) & \cos\left(\frac{7\pi}{16}\right) & \cos\left(\frac{9\pi}{16}\right) & \cos\left(\frac{11\pi}{16}\right) & \cos\left(\frac{13\pi}{16}\right) & \cos\left(\frac{15\pi}{16}\right) \\ \cos\left(\frac{2\pi}{16}\right) & \cos\left(\frac{6\pi}{16}\right) & \cos\left(\frac{10\pi}{16}\right) & \cos\left(\frac{14\pi}{16}\right) & \cos\left(\frac{18\pi}{16}\right) & \cos\left(\frac{22\pi}{16}\right) & \cos\left(\frac{26\pi}{16}\right) & \cos\left(\frac{30\pi}{16}\right) \\ \cos\left(\frac{3\pi}{16}\right) & \cos\left(\frac{9\pi}{16}\right) & \cos\left(\frac{15\pi}{16}\right) & \cos\left(\frac{21\pi}{16}\right) & \cos\left(\frac{27\pi}{16}\right) & \cos\left(\frac{33\pi}{16}\right) & \cos\left(\frac{39\pi}{16}\right) & \cos\left(\frac{45\pi}{16}\right) \\ \cos\left(\frac{4\pi}{16}\right) & \cos\left(\frac{12\pi}{16}\right) & \cos\left(\frac{20\pi}{16}\right) & \cos\left(\frac{28\pi}{16}\right) & \cos\left(\frac{36\pi}{16}\right) & \cos\left(\frac{44\pi}{16}\right) & \cos\left(\frac{52\pi}{16}\right) & \cos\left(\frac{60\pi}{16}\right) \\ \cos\left(\frac{5\pi}{16}\right) & \cos\left(\frac{15\pi}{16}\right) & \cos\left(\frac{25\pi}{16}\right) & \cos\left(\frac{35\pi}{16}\right) & \cos\left(\frac{45\pi}{16}\right) & \cos\left(\frac{55\pi}{16}\right) & \cos\left(\frac{65\pi}{16}\right) & \cos\left(\frac{75\pi}{16}\right) \\ \cos\left(\frac{6\pi}{16}\right) & \cos\left(\frac{18\pi}{16}\right) & \cos\left(\frac{30\pi}{16}\right) & \cos\left(\frac{42\pi}{16}\right) & \cos\left(\frac{54\pi}{16}\right) & \cos\left(\frac{66\pi}{16}\right) & \cos\left(\frac{78\pi}{16}\right) & \cos\left(\frac{90\pi}{16}\right) \\ \cos\left(\frac{7\pi}{16}\right) & \cos\left(\frac{21\pi}{16}\right) & \cos\left(\frac{35\pi}{16}\right) & \cos\left(\frac{49\pi}{16}\right) & \cos\left(\frac{63\pi}{16}\right) & \cos\left(\frac{77\pi}{16}\right) & \cos\left(\frac{91\pi}{16}\right) & \cos\left(\frac{105\pi}{16}\right) \end{pmatrix}$$

FIG. 22

$$1^{st} \text{ vector} \quad \frac{(C_{31})VDD}{C_{int}} \quad \cdots (\text{EXPRESSION 1})$$

$$2^{nd} \text{ vector} \quad \frac{(C_{32})VDD}{C_{int}} \quad \cdots (\text{EXPRESSION 2})$$

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 3})$$

$$\begin{pmatrix} C1 \\ C2 \\ C3 \\ C4 \end{pmatrix} = \begin{pmatrix} Y1 \\ Y2 \\ Y3 \\ Y4 \end{pmatrix} \quad \cdots (\text{EXPRESSION 4})$$

LINEAR SYSTEM COEFFICIENT ESTIMATING METHOD, INTEGRATED CIRCUIT, AND ELECTRONIC DEVICE

TECHNICAL FIELD

The present invention relates to a linear system coefficient estimating method, an integrated circuit, and an electronic device each of which estimates or detects capacitance values of matrix-formed capacitors by driving drive lines in accordance with a plurality of code sequences.

BACKGROUND ART

There has been known a device for detecting capacitance values distributed in a matrix. Patent Literature 1, for example, discloses a capacitance detecting device for detecting distribution of capacitance values of a capacitor matrix formed between M drive lines and L sense lines. According to the capacitance detecting device, in a case where a touch panel is touched with a finger or a pen, a touched capacitor has a reduced capacitance value. This causes the capacitance detecting device to detect a change which reduced a capacitance value, so as to detect the touch with the finger or the pen.

FIG. 21 is a view schematically illustrating a configuration of a conventional touch panel system 91. FIG. 22 is a view for explaining a method for driving the touch panel system 91. The touch panel system 91 includes a touch panel 92. The touch panel 92 includes drive lines DL1 through DL4, sense lines SL1 through SL4, and capacitors C11 through C44 provided at intersections of the drive lines DL1 through DL4 and the sense lines SL1 through SL4.

The touch panel system 91 includes a driving section 94. The driving section 94 drives the drive lines DL1 through DL4 in accordance with a code sequence with 4 rows and 4 columns which code sequence is represented by EXPRESSION 3 of FIG. 22. The driving section 94 applies a source voltage VDD in a case where an element of the code sequence is "1". Meanwhile, the driving section 94 applies zero volt in a case where the element of the code sequence is "0".

The touch panel system 91 includes four amplifiers 98 provided so as to correspond to the respective sense lines SL1 through SL4. The amplifiers 98 (i) receive respective linear sums Y1, Y2, Y3, and Y4 of capacitances of capacitors which are driven by the driving section 94 and are provided along the respective sense lines SL, and (ii) amplify the linear sums Y1, Y2, Y3, and Y4.

For example, during the first driving of four times of driving in accordance with the code sequence with 4 rows and 4 columns, the driving section 94 applies the source voltage VDD to the drive line DL1, and applies zero volt to each of the remaining drive lines DL2 through DL4. Then, for example, an output corresponding to the capacitor C31 and represented by EXPRESSION 1 of FIG. 22 is supplied, as the measured value Y1, from the sense line SL3 to a corresponding amplifier 98.

During the second driving, the driving section 94 applies the source voltage VDD to the drive line DL2, and applies zero volt to each of the remaining drive lines DL1, DL3, and DL4. Then, an output corresponding to the capacitor C32 and represented by EXPRESSION 2 of FIG. 22 is supplied, as the measured value Y2, from the sense line SL3 to a corresponding amplifier 98.

During the third driving, the driving section 94 applies the source voltage VDD to the drive line DL3, and applies zero volt to each of the remaining drive lines. During the fourth driving, the driving section 94 applies the source voltage VDD to the drive line DL4, and applies zero volt to each of the remaining drive lines.

This causes the measured values Y1, Y2, Y3, and Y4 themselves to be associated with the respective capacitance values C1, C2, C3, and C4 (see EXPRESSION 3 and EXPRESSION 4 of FIG. 22).

CITATION LIST

Patent Literature

Patent Literature 1
Specification of Japanese Patent No. 4364609 (Publication Date: Jun. 16, 2005)

SUMMARY OF INVENTION

Technical Problem

However, the configurations shown in FIGS. 21 and 22 cause the following problem. That is, since data on only a capacitor which intersects with one drive line can be obtained per measurement, a noise component does not decrease, so that it is difficult to accurately detect a change in capacitance of a capacitor.

An object of the present invention is to provide a linear system coefficient estimating method, an integrated circuit, and an electronic device each of which is capable of accurately detecting a change in capacitance of a capacitor.

Solution to Problem

In order to attain the object, a linear system coefficient estimating method of the present invention in which N linear sums of M target coefficients are obtained by driving the M target coefficients in parallel in accordance with N M-dimensional vectors and values of the M target coefficients are estimated based on an inner product operation carried out with respect to (i) the N linear sums of the M target coefficients and (ii) M N-dimensional vectors, the linear system coefficient estimating method includes: a first estimating step of estimating a first estimated value of the M target coefficients by driving the M target coefficients in parallel in a first order of the N M-dimensional vectors; a second estimating step of estimating a second estimated value of the M target coefficients by driving the M target coefficients in parallel in a second order of the N M-dimensional vectors which second order is different from the first order; and an averaging step of estimating the values of the M target coefficients by averaging the first estimated value and the second estimated value.

According to the configuration, the first estimated value of the M target coefficients is estimated by driving the M target coefficients in parallel in the first order of the N M-dimensional vectors; the second estimated value of the M target coefficients is estimated by driving the M target coefficients in parallel in the second order of the N M-dimensional vectors which second order is different from the first order; and the values of the M target coefficients are estimated by averaging the first estimated value and the second estimated value. For this reason, results of estimation of capacitances are added and averaged by reversing an order of scanning for each time. Therefore, it is possible to reduce false peaks that are different from proper peaks of a capacitance distribution and appear when the values of the target coefficients change during a period in which the N linear sums of the target coefficients are found.

In order to attain the object, a linear system coefficient estimating method of the present invention in which N linear sums of M target coefficients are obtained by driving the M target coefficients in parallel in accordance with N M-dimensional vectors and values of the M target coefficients are estimated based on an inner product operation carried out with respect to (i) the N linear sums of the M target coefficients and (ii) the N M-dimensional vectors, the N M-dimensional vectors each containing M elements which are arranged in a transverse direction, the N M-dimensional vectors being arranged in a longitudinal direction, the N M-dimensional vectors being arranged so that a value obtained by adding (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction monotonously changes in the longitudinal direction, the linear system coefficient estimating method includes a monotonous change estimating step of estimating the values of the M target coefficients by driving the M target coefficients in parallel in an order of the N M-dimensional vectors arranged in the longitudinal direction.

According to the configuration, the N M-dimensional vectors each contain the M elements which are arranged in the transverse direction, the N M-dimensional vectors are arranged in the longitudinal direction, the N M-dimensional vectors are arranged so that the number of times of a change in the M elements of each of the N M-dimensional vectors between an increase and a decrease in value in the transverse direction monotonously changes in the longitudinal direction, and the values of the M target coefficients are estimated by driving the M target coefficients in parallel in the order of the N M-dimensional vectors arranged in the longitudinal direction. The N M-dimensional vectors are arranged so that (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction monotonously change in the longitudinal direction and so that the M elements are arranged in an order of a frequency which increases and decreases in the transverse direction. Therefore, in a case where the target coefficients are estimated by carrying out driving in accordance with the N M-dimensional vectors which are thus arranged in the order of the frequency, it is possible to reduce false peaks that are different from proper peaks of a capacitance distribution and appear when the values of the target coefficients change during a period in which the N linear sums of the target coefficients are found.

In order to attain the object, an integrated circuit of the present invention includes: a driving section which drives M target coefficients in parallel in accordance with N M-dimensional vectors; and an estimating section which obtains N linear sums of the M target coefficients in accordance with the driving in parallel by the driving section and estimates values of the M target coefficients based on an inner product operation carried out with respect to (i) the N linear sums of the M target coefficients and (ii) the N M-dimensional vectors, the driving section driving the M target coefficients in parallel in a first order of the N M-dimensional vectors, the estimating section estimating a first estimated value of the M target coefficients in accordance with the driving in parallel in the first order, the driving section driving the M target coefficients in parallel in a second order of the N M-dimensional vectors which second order is different from the first order, the estimating section estimating a second estimated value of the M target coefficients in accordance with the driving in parallel in the second order, and the integrated circuit further including an averaging section estimating the values of the M target coefficients by averaging the first estimated value and the second estimated value.

According to the configuration, the driving section drives the M target coefficients in parallel in the first order of the N M-dimensional vectors, the estimating section estimates the first estimated value of the M target coefficients in accordance with the driving in parallel in the first order, the driving section drives the M target coefficients in parallel in the second order of the N M-dimensional vectors which second order is different from the first order, the estimating section estimates the second estimated value of the M target coefficients in accordance with the driving in parallel in the second order, and the values of the M target coefficients are estimated by averaging the first estimated value and the second estimated value. For this reason, results of estimation of capacitances are added and averaged by reversing an order of scanning for each time. Therefore, it is possible to reduce false peaks that are different from proper peaks of a capacitance distribution and appear when the values of the target coefficients change during a period in which the N linear sums of the target coefficients are found.

In order to attain the object, an integrated circuit of the present invention includes: a driving section which drives M target coefficients in parallel in accordance with N M-dimensional vectors; and an estimating section which obtains N linear sums of the M target coefficients in accordance with the driving in parallel by the driving section and estimates values of the M target coefficients based on an inner product operation carried out with respect to (i) the N linear sums of the M target coefficients and (ii) the N M-dimensional vectors, the N M-dimensional vectors each containing M elements which are arranged in a transverse direction, the N M-dimensional vectors being arranged in a longitudinal direction, the N M-dimensional vectors being arranged so that (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction monotonously change in the longitudinal direction, and the estimating section estimating the values of the M target coefficients by driving the M target coefficients in parallel in an order of the N M-dimensional vectors arranged in the longitudinal direction.

According to the configuration, the N M-dimensional vectors each contain the M elements which are arranged in the transverse direction, the N M-dimensional vectors are arranged in the longitudinal direction, the N M-dimensional vectors are arranged so that the number of times of a change in the M elements of each of the N M-dimensional vectors between an increase and a decrease in value in the transverse direction monotonously changes in the longitudinal direction, and the estimating section estimates the values of the M target coefficients by driving the M target coefficients in parallel in an order of the N M-dimensional vectors arranged in the longitudinal direction. The N M-dimensional vectors are arranged so that the number of times of a change in the M elements of each of the N M-dimensional vectors between an increase and a decrease in value in the transverse direction monotonously changes in the longitudinal direction and so that the M elements are arranged in an order of a frequency which increases and decreases in the transverse direction.

Therefore, in a case where the M target coefficients are estimated by carrying out driving in accordance with the N M-dimensional vectors which are thus arranged in the order of the frequency, it is possible to reduce false peaks that are different from proper peaks of a capacitance distribution and appear when the values of the target coefficients change during a period in which the N linear sums of the target coefficients are found.

In order to attain the object, an electronic device of the present invention includes: an integrated circuit of the present invention; a touch panel which is controlled by the integrated circuit; and a display panel which is placed on the touch panel or contains the touch panel.

According to the configuration, it is possible to reduce false peaks that are different from proper peaks of a capacitance distribution and appear when the values of the target coefficients change during a period in which the N linear sums of the target coefficients are found.

Advantageous Effects of Invention

As described above, a linear system coefficient estimating method of the present invention includes: a first estimating step of estimating a first estimated value of the M target coefficients by driving the M target coefficients in parallel in a first order of the N M-dimensional vectors; a second estimating step of estimating a second estimated value of the M target coefficients by driving the M target coefficients in parallel in a second order of the N M-dimensional vectors which second order is different from the first order; and an averaging step of estimating the values of the M target coefficients by averaging the first estimated value and the second estimated value. Therefore, it is possible to reduce false peaks that are different from proper peaks of a capacitance distribution and appear when the values of the target coefficients change during a period in which the N linear sums of the target coefficients are found.

For a fuller understanding of the nature and advantages of the invention, reference should be made to the ensuing detailed description taken in conjunction with the accompanying drawings.

BRIEF DESCRIPTION OF DRAWINGS (a) of FIG. 1 is a view schematically illustrating a configuration of a touch panel system on which embodiments of the present invention are premised. (b) of FIG. 1 is a view illustrating a configuration of a code sequence for driving the touch panel system.

(a) of FIG. 2 is a view showing a specific example of a matrix F with M rows and N columns. (b) of FIG. 2 is a view showing a specific example of a matrix H with N rows and M columns. (c) of FIG. 2 is a view showing a specific example of a matrix Eb.

(a) and (b) of FIG. 3 are views each explaining a method for estimating a capacitance value by carrying out driving in accordance with the code sequence.

FIG. 4 is a view showing an example of the code sequence.

(a) of FIG. 5 is a graph showing a change in capacitance distribution to be estimated by the touch panel system. (b) of FIG. 5 is a graph showing a result of estimation of the capacitance distribution by the touch panel system.

FIG. 6 is a view schematically illustrating a configuration of a touch panel system of Embodiment 1.

(a) of FIG. 7 is a view showing an Hadamard matrix of Embodiment 1 which matrix has 32 rows and 32 columns and is created by Sylvester method. (b) of FIG. 7 is a view showing an Hadamard-Walsh transform matrix of Embodiment 1.

(a) of FIG. 8 is a graph showing a model of a change in capacitance distribution to be estimated by the touch panel system. (b) of FIG. 8 is a graph showing a simulation result which is obtained by estimating the capacitance distribution in accordance with the Hadamard matrix created by Sylvester method. (c) of FIG. 8 is a graph showing a simulation result which is obtained by estimating the capacitance distribution in accordance with the Hadamard-Walsh transform matrix.

(a) of FIG. 9 is a graph showing another model of a change in capacitance distribution to be estimated by the touch panel system. (b) of FIG. 9 is a graph showing a simulation result which is obtained by estimating the capacitance distribution in accordance with the Hadamard matrix created by Sylvester method. (c) of FIG. 9 is a graph showing a simulation result which is obtained by estimating the capacitance distribution in accordance with the Hadamard-Walsh transform matrix.

(a) of FIG. 10 is a graph showing a change in capacitance distribution to be estimated by the touch panel system. (b) of FIG. 10 is a graph showing an experimental result which is obtained by estimating the capacitance distribution in accordance with the Hadamard matrix created by Sylvester method. (c) of FIG. 10 is a graph showing an experimental result which is obtained by estimating the capacitance distribution in accordance with the Hadamard-Walsh transform matrix.

(a) of FIG. 11 is a graph showing another change in capacitance distribution to be estimated by the touch panel system. (b) of FIG. 11 is a graph showing an experimental result which is obtained by estimating the capacitance distribution in accordance with the Hadamard matrix created by Sylvester method. (c) of FIG. 11 is a graph showing an experimental result which is obtained by estimating the capacitance distribution in accordance with the Hadamard-Walsh transform matrix.

(a) of FIG. 12 is a view showing a driving method in which an order of driving in accordance with the orthogonal code sequence of Embodiment 1 is reversed at the time of the 2nd driving. (b) of FIG. 12 is a graph showing a result of estimation of the capacitance distribution in accordance with driving by the driving method.

FIG. 13 is a graph showing a temporal change in capacitance distribution to be estimated by the touch panel system of Embodiment 1.

(a) of FIG. 14 is a view showing another driving method in accordance with a code sequence. (b) of FIG. 14 is a graph showing a result of estimation of the capacitance distribution in accordance with driving by the another driving method.

(a) of FIG. 15 is a view showing a driving method in which the order of driving in accordance with the orthogonal code sequence of Embodiment 1 is changed at random. (b) of FIG. 15 is a graph showing a result of estimation of the capacitance distribution in accordance with driving by the driving method.

FIG. 16 is a view for explaining properties of a code sequence of Embodiment 2.

(a) of FIG. 17 is a view for explaining a driving method in accordance with an Hadamard-Walsh transform matrix of Embodiment 2. (b) of FIG. 17 is a graph showing a result of estimation of a capacitance distribution in accordance with driving by the driving method.

FIG. 18 is a view for explaining a driving method in accordance with a DCT matrix of Embodiment 2.

(a) of FIG. 19 is a view showing a driving method in which an order of driving in accordance with the Hadamard-Walsh transform matrix of Embodiment 2 is reversed at the time of the 2nd driving. (b) of FIG. 19 is a graph showing a result of estimation of the capacitance distribution in accordance with driving by the driving method.

FIG. 22 is a view for explaining a method for driving the conventional touch panel system.

DESCRIPTION OF EMBODIMENTS

In the prior Japanese patent application of the present application (Japanese Patent Application Publication, Tokugan, No. 2011-022022 (Publication Date: Feb. 9, 2011, Priority Date: Nov. 12, 2010)), the inventors of the present invention proposed a touch panel system which estimates a capacitance by driving a drive line in accordance with an orthogonal code sequence, and embodiments of the present invention are premised on the proposed touch panel system. Therefore, first of all, the touch panel system proposed in the prior application will be mainly discussed as a premise of the embodiments of the present invention. Then, various types of touch panel systems in accordance with the embodiments of the present invention will be discussed.

Premise of Embodiments of the Present Invention (Driving in Accordance with a Plurality of Code Sequences)

Figure 1:
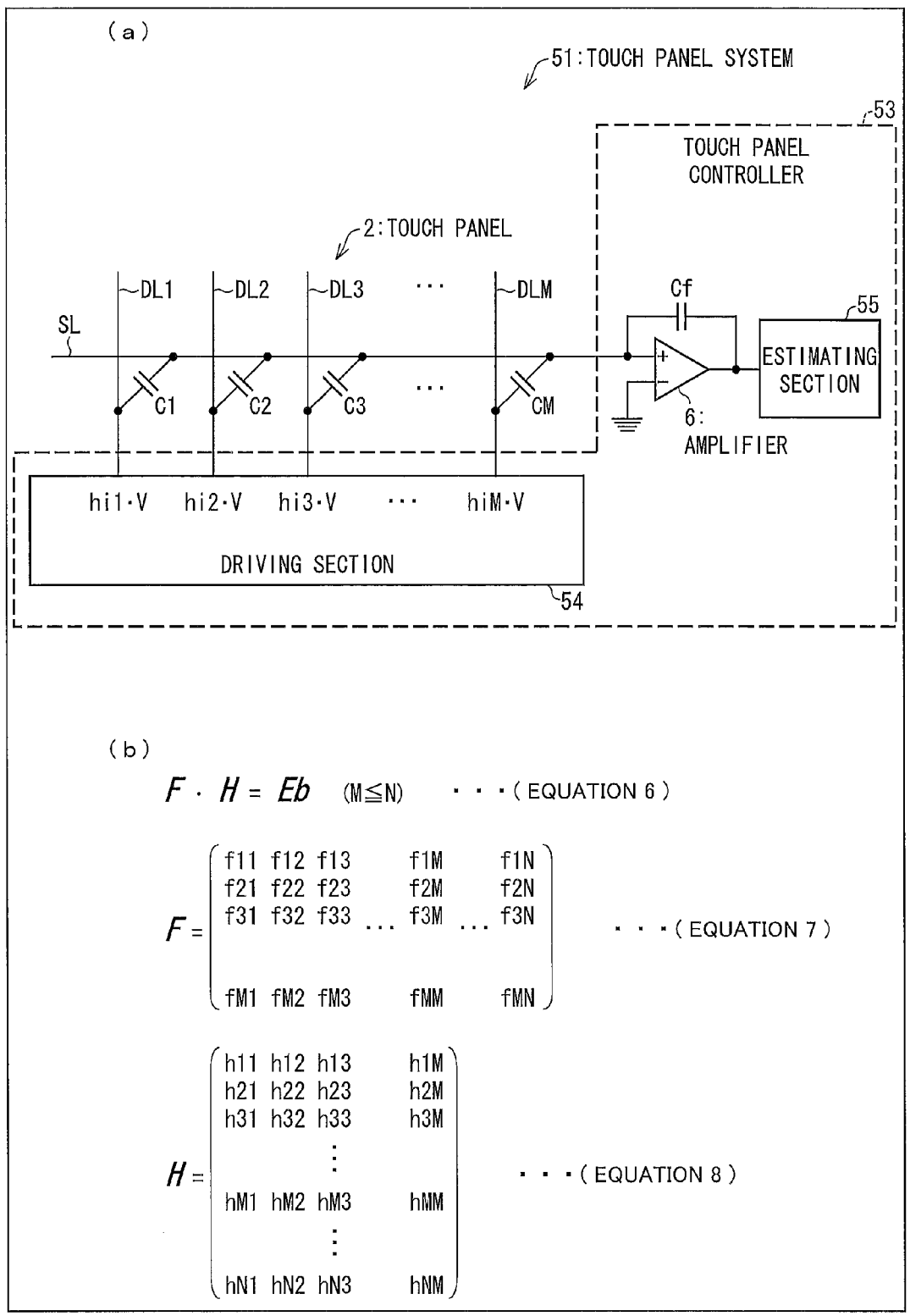
Figure 2:
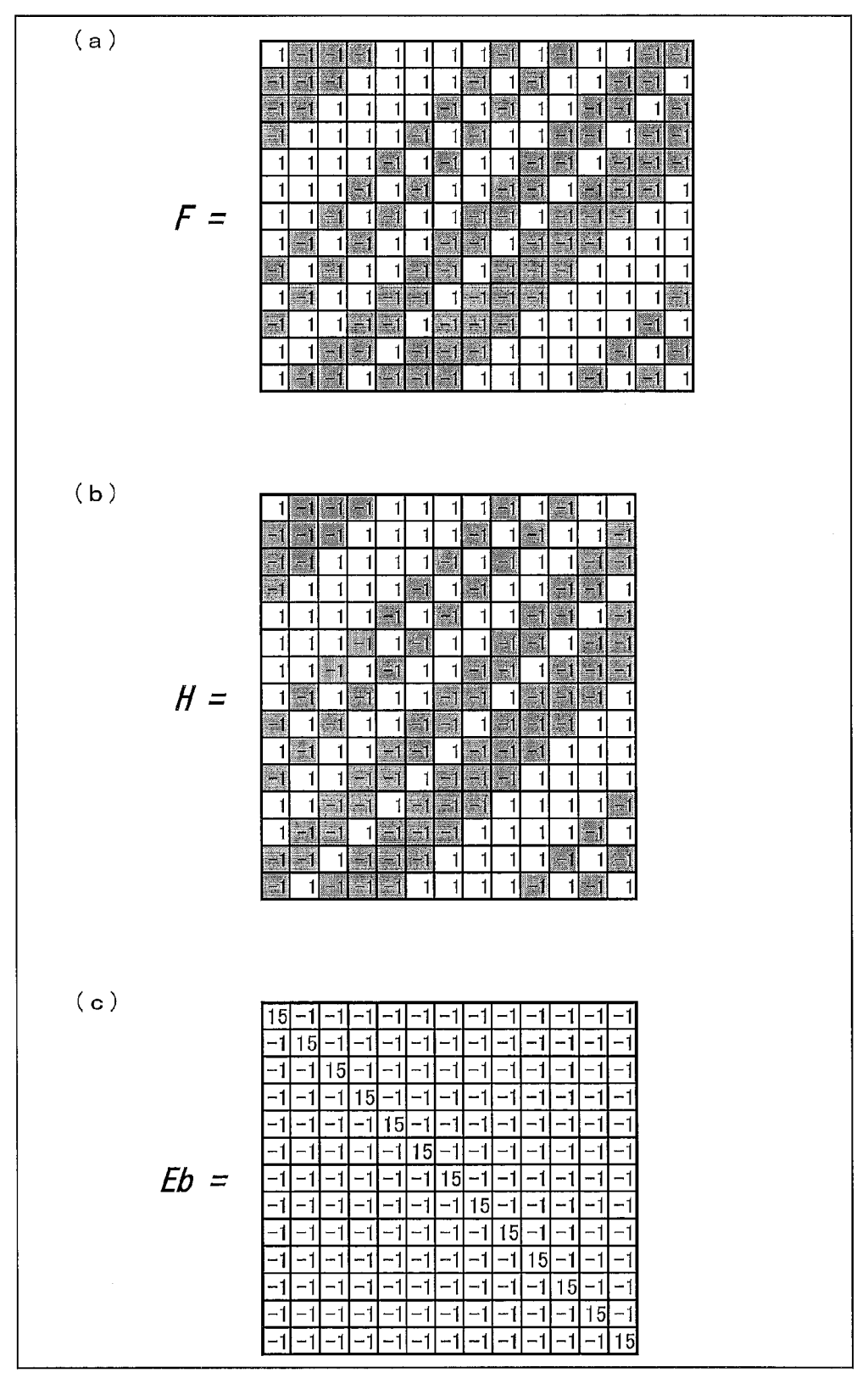

(a) of FIG. 1 is a view schematically illustrating a configuration of a touch panel system 51 on which embodiments of the present invention are premised. (b) of FIG. 1 is a view illustrating a configuration of a code sequence H for driving the touch panel system 51. (a) of FIG. 2 is a view showing a specific example of a matrix F with M rows and N columns. (b) of FIG. 2 is a view showing a specific example of a matrix H with N rows and M columns. (c) of FIG. 2 is a view showing a specific example of a matrix Eb.

(a) and (b) of FIG. 3 are views each explaining a method for estimating a capacitance value by carrying out driving in accordance with the orthogonal code sequence.

The touch panel system 51 includes a touch panel 2 and a touch panel controller 53. The touch panel 2 includes M drive lines DL1 through DLM and a plurality of sense lines. However, for simplification of description, the plurality of sense lines is described assuming that only one sense line SL is provided. Capacitors C1 through CM are provided at intersections of the drive lines DL1 through DLM and the sense line SL.

The touch panel controller 53 includes a driving section 54. The driving section 54 drives the drive lines DL1 through DLM in parallel in accordance with the code sequence H having N rows and M columns (M≤N) and represented by EXPRESSION 8 of (b) of FIG. 1. The driving section 54 applies a voltage V in a case where an element of the code sequence H is "1". Meanwhile, the driving section 54 applies a voltage −V in a case where the element of the code sequence H is "−1".

Assume that a code sequence F with M rows and N columns which code sequence is represented by EXPRESSION 7 of (b) of FIG. 1 is a code sequence which makes it possible to obtain, as a result of an inner product operation carried out with respect to the code sequence F and the code sequence H, a matrix Eb which is a square matrix with M rows and M columns and in which an absolute value of a diagonal element is relatively larger than an absolute value of a non-diagonal element. (a) through (c) of FIG. 2 show specific examples of the code sequence H, the code sequence F, the matrix Eb, respectively, that is, examples of 13-row matrices taken from an M sequence with 15 rows and 15 columns (15 cycles) (M=13≤N=15). (b) of FIG. 2 shows a specific example of the code sequence H with 15 rows and 13 columns. (a) of FIG. 2 shows a specific example of the code sequence F with 13 rows and 15 columns. (c) of FIG. 2 shows a specific example of the square matrix Eb with 13 rows and 13 columns.

According to the embodiment of the present invention, an orthogonal code sequence can be used as the code sequence H. Alternatively, a code sequence other than the orthogonal code sequence can also be used as the code sequence H.

The "orthogonal code sequence" herein means code sequences di (=di1, di2, . . . , diN, where i=1, . . . , M) each of which has a code length N and satisfies the following condition:

$$di \cdot dk = \sum_{j=1}^{N} dij \times dkj \qquad \text{[Math. 1]}$$
$$= N \times \delta ik$$

where $\delta ik = 1$ if $i = k$ $\delta ik = 0$ if $i \neq k$

Examples of the "orthogonal code sequence" encompass an Hadamard matrix created by Sylvester method, an Hadamard-Walsh transform matrix, and a Discrete Cosine Transform (DCT) matrix.

The Hadamard matrix created by Sylvester method first creates a building block of 2 rows×2 columns as a basic structure. The building block includes four bits, among which an upper right one, an upper left one, and a lower left one are identical to one another, whereas a lower right one is an inverse of the above bits.

The method then combines four blocks of the above 2×2 basic structure at upper right, upper left, lower right, and lower left locations so as to create codes in a bit arrangement of 4 rows×4 columns. The method also inverts a bit in the lower right block as in the above creation of a 2×2 building block. Next, the method similarly creates codes in a bit arrangement of 8 rows×8 columns, and then creates codes in a bit arrangement of 16 rows×16 columns. These matrices each satisfy the above-mentioned definition of the "orthogonal code sequence" of the present invention. The orthogonal code sequence of 4 rows×4 columns shown in FIG. 2 is an Hadamard matrix having 4 rows and 4 columns and created by Sylvester method.

Note here that an Hadamard matrix is a square matrix which includes elements each being 1 or −1 and which includes rows orthogonal to one another. In other words, any two rows in an Hadamard matrix represent vectors perpendicular to each other.

The "orthogonal code sequences" of the present invention can be any N-row matrix taken from an M-dimensional Hadamard matrix (where N≤M). As described below, an Hadamard matrix created by a method other than Sylvester method can alternatively be used in the present invention.

While any N-dimensional Hadamard matrix created by Sylvester method can be expressed by a power of M=2, it is assumed that an Hadamard matrix can be created if M is a multiple of 4. For example, Hadamard matrices can be created when M=12 and when M=20. These Hadamard matrices created by a method other than Sylvester method can alternatively be used as the orthogonal code sequences of the present embodiment.

The touch panel controller 53 includes an amplifier 6 provided so as to correspond to the sense line SL. The amplifier 6 (i) receives a linear sum Vi (i=1, 2, ..., M) (represented by the following equation 5) of a capacitance of a capacitor which is driven by the driving section 54 and is provided along the sense line SL and (ii) amplifies the linear sum Vi.

[Math. 2]

$$Vi = -V(hi1 \cdot C1 + hi2 \cdot C2 + hi3 \cdot C3 + \ldots + hiM \cdot CM)/Cf \quad \text{(Equation 5)}$$

As represented by Equation 9 of (a) of FIG. 3 and Equation 10 of (b) of FIG. 3, capacitances of capacitors C1, C2, ..., CM can be approximately estimated by carrying out a matrix operation of the measured values (linear sums) V1, V2, ..., VM, ..., VN and the code sequence F.

(Problem Arising in Driving in Accordance with Orthogonal Code Sequence)

As described above, a plurality of capacitances of the capacitors C1, C2, ..., CM which are connected with the sense line SL need to be estimated by, for example, a plurality of linear sums V1, V2, ..., VM which is obtained by driving drive lines in accordance with an Hadamard matrix M1 created by Sylvester method shown in FIG. 3. The inventors of the present invention found a problem such that capacitance values to be estimated change while the plurality of linear sums V1, V2, ..., VM is being found.

The inventors of the present invention found the following problem. A capacitance value to be estimated changes when a finger which is in contact with a touch panel moves on the touch panel. The drive lines DL1 through DLM are configured to drive at a speed high enough for the movement of the finger on the touch panel to be neglected. However, in a case where the finger moves fast, the movement of the finger may cause a slight change in capacitance while a plurality of linear sums V1, V2, ..., VM is being found by driving the drive lines. In this case, though the drive lines DL1 through DLM are originally driven a plurality of times assuming that there exists one fixed solution of the capacitance, the capacitance, which should be a solution, gradually changes. For this reason, despite the change in capacitance, in a case where a capacitance is estimated assuming that there exists one fixed solution, a solution which is unexpected and is completely incorrect may be obtained.

The above problem can be solved by a method for driving the drive lines at a speed higher enough for the movement of the finger on the touch panel to be neglected. However, it is difficult to drive the drive lines at a higher speed. Therefore, a method is requested for reducing a burden imposed by high-speed driving of the drive lines. The present invention has been made so as to solve the problem.

Figure 4:
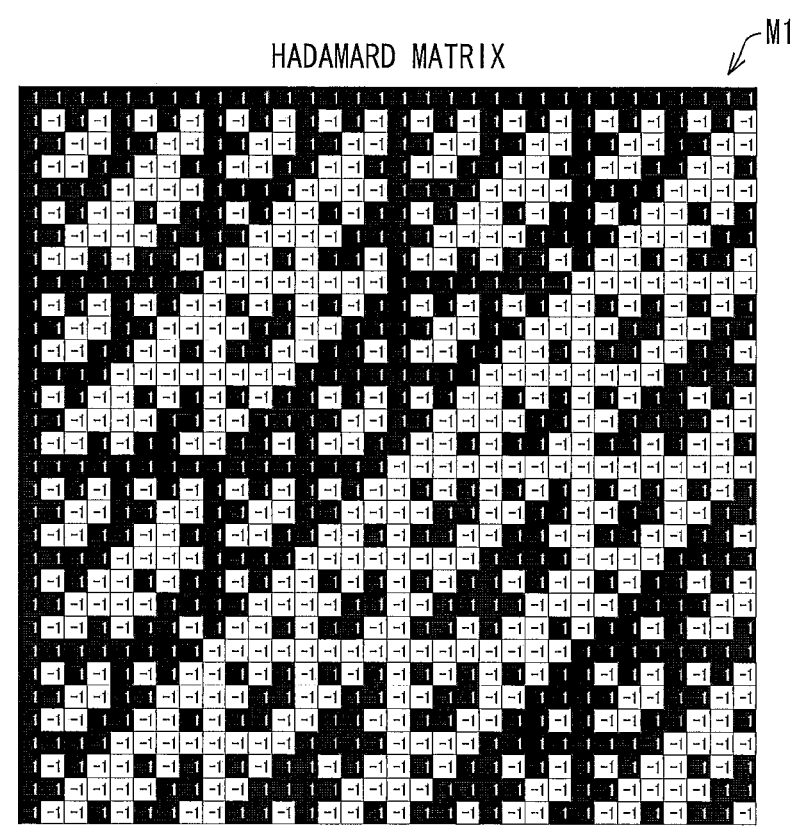
Figure 5:
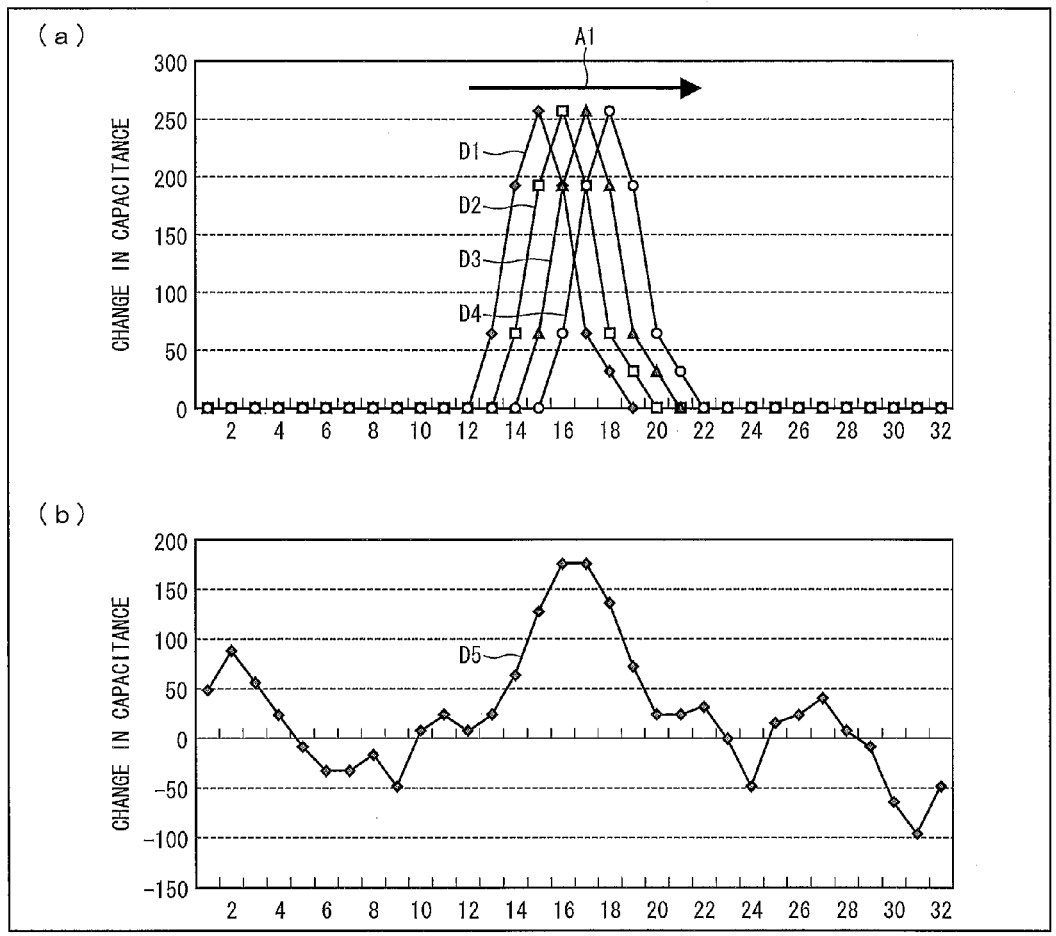

FIG. 4 is a view showing an example of the code sequence. (a) of FIG. 5 is a graph showing a change in capacitance distribution to be estimated by the touch panel system 51. (b) of FIG. 5 is a graph showing a result of estimation of the capacitance distribution by the touch panel system 51.

FIG. 4 shows, as an example of the orthogonal code sequence, an Hadamard matrix M1 having 32 rows and 32 columns and created by Sylvester method. Elements whose letters are printed in black each indicate "−1", and elements whose letters are printed in white each indicate "1".

In (a) of FIG. 5, linear sums are found by driving the drive lines in order by rows from the 1st row to the 32nd row of the Hadamard matrix M1. While the driving is being carried out 32 times from the 1st row to the 32nd row, the capacitance distribution may be gradually shifted (see the graph of (a) of FIG. 5). The graph of (a) of FIG. 5 has (i) a horizontal axis indicating 32 locations of capacitors provided along a sense line and (ii) a vertical axis indicating a change in capacitance. A line D1 indicates an average for a distribution of a change in capacitance when the driving is carried out by the rows from the 1st row to the 8th row of the Hadamard matrix M1. A line D2 indicates an average for a distribution of a change in capacitance when the driving is carried out by the rows from the 9th row to the 16th row of the Hadamard matrix M1. A line D3 indicates an average for a distribution of a change in capacitance when the driving is carried out by the rows from the 17th row to the 24th row of the Hadamard matrix M1. A line D4 indicates an average for a distribution of a change in capacitance when the driving is carried out by the rows from the 25th row to the 32nd row of the Hadamard matrix M1. In a case where the 32 rows of the Hadamard matrix M1 are divided into four groups of eight rows and an average for a capacitance distribution is found when the driving is carried out by each of the four groups, the average is shifted in a direction indicated by an arrow A1 (see the lines D1 through D4).

Assume that, in a case where the movement of the finger causes a change in capacitance while the plurality of linear sums V1, V2, ..., VM is being found by driving the drive lines (see (a) of FIG. 5), the capacitances are estimated by multiplying the plurality of linear sums V1, V2, ..., VM by an inverse matrix F. In this case, as shown by a line D5 of the graph of (b) of FIG. 5, there occurs a problem such that a large peak appears at a location on the line D5 which location is determined by averaging four capacitance distributions shown by the respective lines D1 through D4, and some irregularities (false peaks) also appear at both ends of the line D5.

Assuming that the capacitance distribution is temporally fixed without being shifted while the drive lines are being driven 32 times, a capacitance distribution of the capacitances of capacitors C1 through C32 is accurately found by multiplying the linear sums by the matrix F after the driving is carried out 32 times. However, this is based on the assumption that the capacitance distribution does not change while the drive lines are being driven 32 times. In a case where the capacitance distribution changes while the driving is being carried out, there occurs a problem such that a considerably large error occurs.

Embodiment 1

Figure 6:
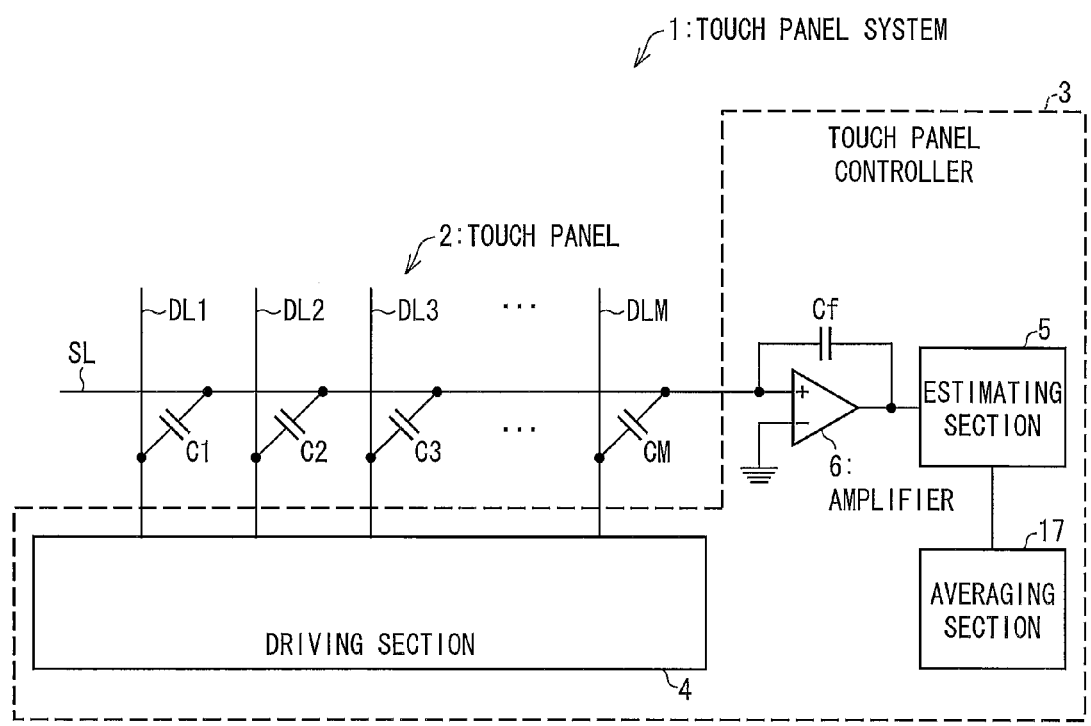
Figure 7:
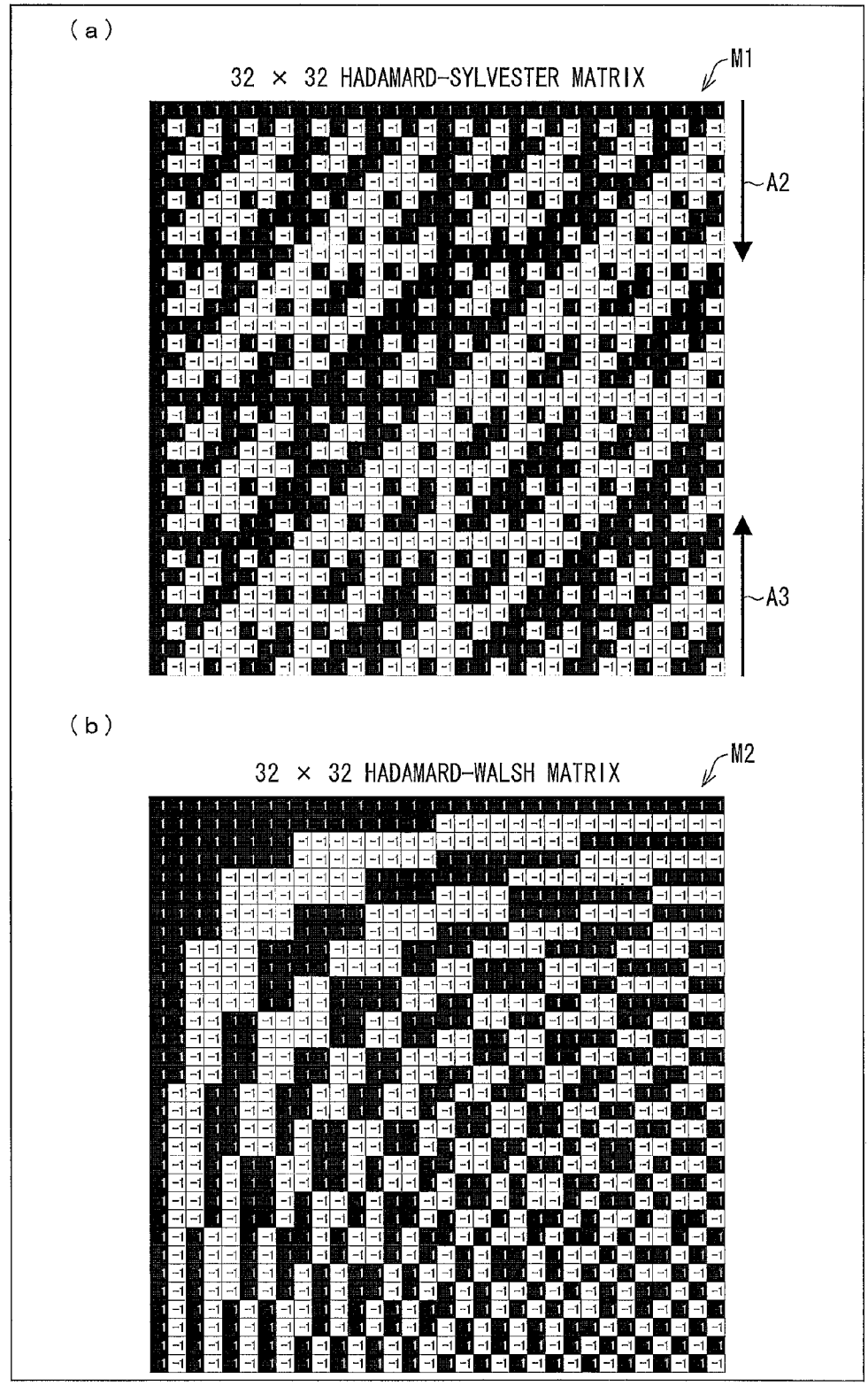

FIG. 6 is a view schematically illustrating a configuration of a touch panel system 1 of Embodiment 1. (a) of FIG. 7 is a view showing an Hadamard matrix M1 of Embodiment 1 which matrix has 32 rows and 32 columns and is created by Sylvester method. (b) of FIG. 7 is a view showing an Hadamard-Walsh transform matrix M2 of Embodiment 1.

The touch panel system 1 includes a touch panel 2 and a touch panel controller 3. The touch panel 2 includes M drive lines DL1 through DLM and a plurality of sense lines. For simplification of description, the plurality of sense lines is described by showing only one sense line SL in FIG. 6. Capacitors C1 through CM (target coefficients) are provided at intersections of the drive lines DL1 through DLM and the sense line SL.

The touch panel controller 3 includes a driving section 4. The driving section 4 drives the drive lines DL1 through DLM in accordance with the Hadamard matrix M1 shown in (a) of FIG. 7 or the Hadamard-Walsh transform matrix M2 shown in (b) of FIG. 7. The driving section 4 applies a voltage V in a case where an element of the Hadamard matrix M1 or an element of the Hadamard-Walsh transform matrix M2 is "1". Meanwhile, the driving section 4 applies a voltage −V in a case where the element of the Hadamard matrix M1 or the element of the Hadamard-Walsh transform matrix M2 is "−1".

The touch panel controller 3 includes an amplifier 6 provided so as to correspond to the sense line SL. The amplifier 6, which has a noninverting input terminal and an output between which an integral capacitor Cf is provided, (i) receives a linear sum Vi (i=1, 2, . . . , M) of a capacitance of a capacitor which is driven by the driving section 4 and is provided along the sense line SL (ii) and amplifies the linear sum Vi.

The touch panel controller 3 includes an estimating section 5. The estimating section 5 estimates capacitances of the capacitors C1, C2, . . . , CM based on an inner product operation carried out with respect to (i) the linear sum Vi (i=1, 2, . . . , M) amplified by the amplifier 6 and (ii) the Hadamard matrix M1 or the Hadamard-Walsh transform matrix M2.

The Hadamard-Walsh transform matrix M2 shown in (b) of FIG. 7 is obtained by rearranging rows of the Hadamard matrix M1 having 32 rows and 32 columns and created by Sylvester method (see (a) of FIG. 7). According to the Hadamard-Walsh transform matrix M2, the rows are rearranged in order from a row in which a smallest value is obtained by adding (a) the number of times of a change in the elements in one row from an increase to a decrease in value in a transverse direction and (b) the number of times of a change in the elements in the one row from the decrease to the increase in value in the transverse direction. That is, the Hadamard-Walsh transform matrix M2 is obtained by (i) counting values obtained by adding (a) the number of times of a change in the elements in one row from an increase to a decrease in value in a transverse direction and (b) the number of times of a change in the elements in the one row from the decrease to the increase in value in the transverse direction, (ii) arranging, in the first row, a row in which a value obtained by the counting is the smallest, and (iii) rearranging the rows so that the values obtained by the counting increase in a longitudinal direction. The values obtained by the counting correspond to frequency components (spectra) of the respective rows.

Figure 8:
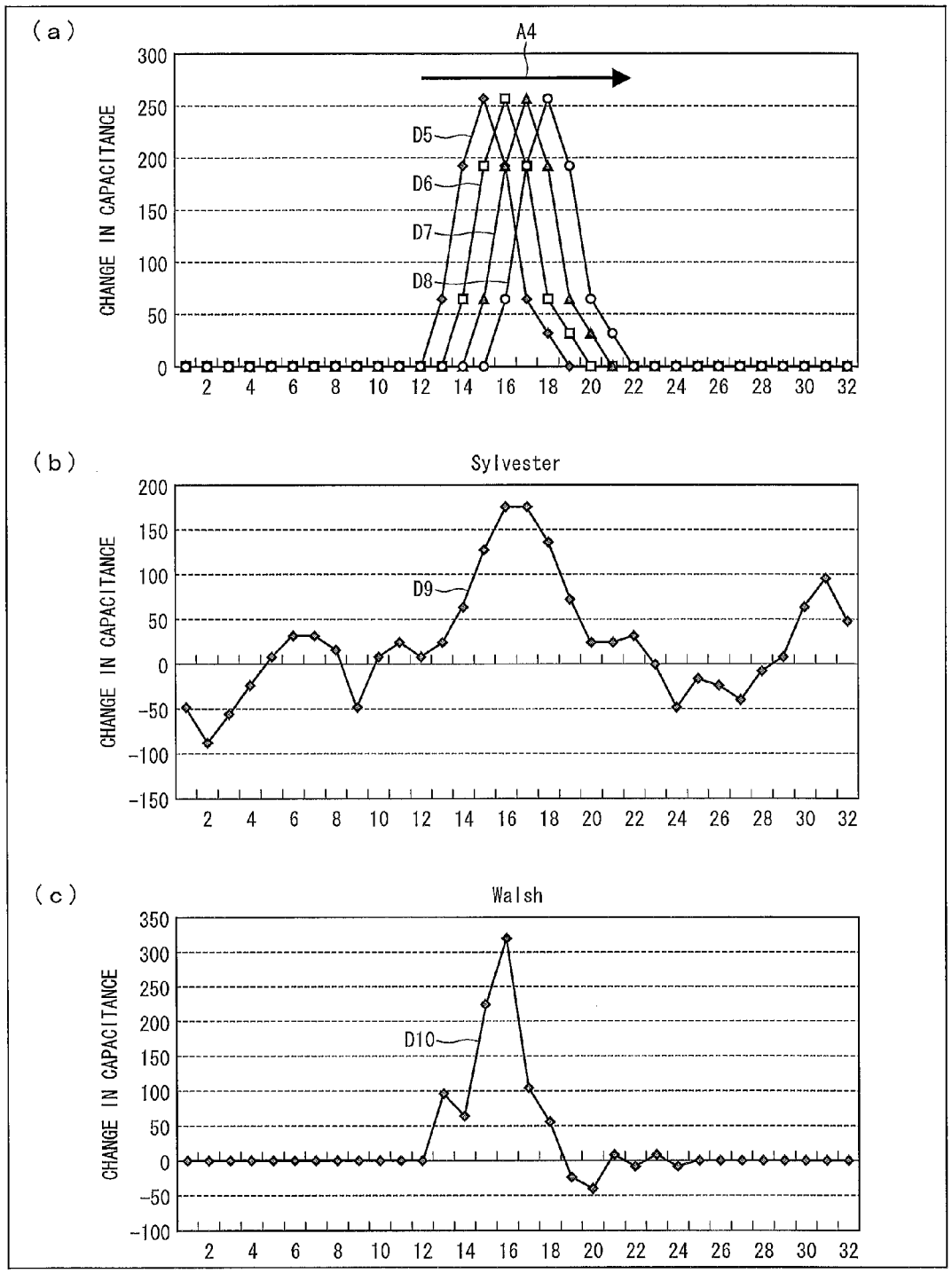

(a) of FIG. 8 is a graph showing a model of a change in capacitance distribution to be estimated by the touch panel system 1. (b) of FIG. 8 is a graph showing a simulation result which is obtained by estimating the capacitance distribution in accordance with the Hadamard matrix created by Sylvester method. (c) of FIG. 8 is a graph showing a simulation result which is obtained by estimating the capacitance distribution in accordance with the Hadamard-Walsh transform matrix.

While the drive lines are driven in order by rows from the 1st row to the 32nd row of the Hadamard matrix M1 or the Hadamard-Walsh transform matrix M2, the capacitance distribution is gradually shifted (see the graph of (a) of FIG. 8). A line D5 indicates an average for a distribution of a change in capacitance when the driving is carried out by the rows from the 1st row to the 8th row of the Hadamard matrix M1 or the Hadamard-Walsh transform matrix M2. A line D6 indicates an average for a distribution of a change in capacitance when the driving is carried out by the rows from the 9th row to the 16th row of the Hadamard matrix M1 or the Hadamard-Walsh transform matrix M2. A line D7 indicates an average for a distribution of a change in capacitance when the driving is carried out by the rows from the 17th row to the 24th row of the Hadamard matrix M1 or the Hadamard-Walsh transform matrix M2. A line D8 indicates an average for a distribution of a change in capacitance when the driving is carried out by the rows from the 25th row to the 32nd row of the Hadamard matrix M1 or the Hadamard-Walsh transform matrix M2.

Assume that, in a case where the capacitance distribution changes in a direction indicated by an arrow A4, while the drive lines are driven in order by the rows from the 1st row to the 32nd row (see (a) of FIG. 8), the driving is carried out in accordance with the Hadamard matrix created by Sylvester method shown in (a) of FIG. 7. In this case, as shown by a line D9 of the graph of (b) of FIG. 8, a large peak appears at a location on the line D9 which location is determined by averaging four capacitance distributions shown by the respective lines D5 through D8, and some irregularities (false peaks) also appear at both ends of the line D9.

In a case where the drive lines are driven in accordance with the Hadamard-Walsh transform matrix M2 shown in (b) of FIG. 7, as shown by a line D10 of (c) of FIG. 8, a large peak appears at a location on the line D10 which location is determined by averaging four capacitance distributions shown by the respective lines D5 through D8 of (a) of FIG. 8, and small irregularities appear near the large peak. However, no large irregularities (false peaks) appear on the line D10.

Figure 9:
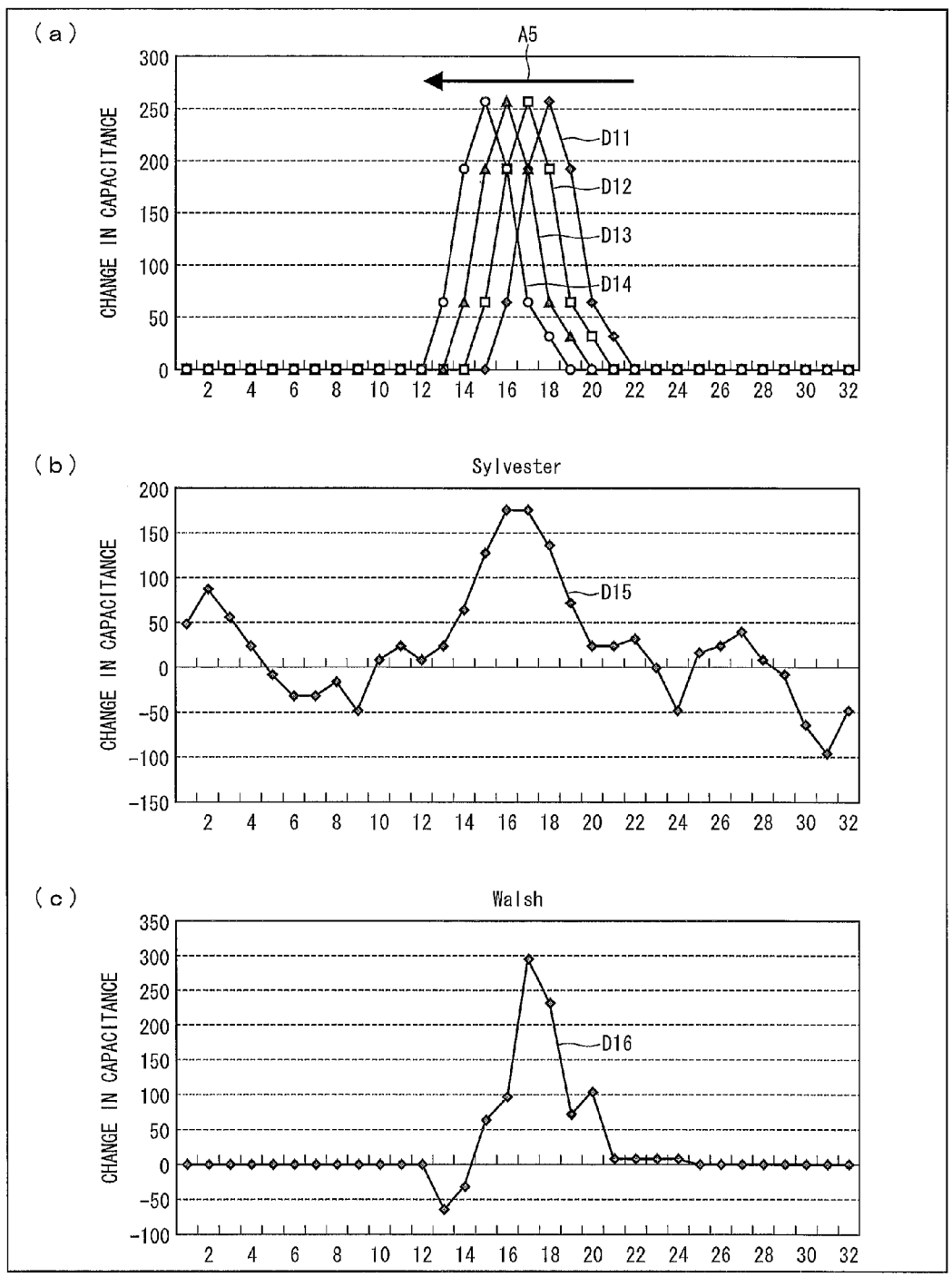

(a) of FIG. 9 is a graph showing another model of a change in capacitance distribution to be estimated by the touch panel system. (b) of FIG. 9 is a graph showing a simulation result which is obtained by estimating the capacitance distribution in accordance with the Hadamard matrix created by Sylvester method. (c) of FIG. 9 is a graph showing a simulation result which is obtained by estimating the capacitance distribution in accordance with the Hadamard-Walsh transform matrix. In a case shown in (a) of FIG. 9, the capacitance distribution is shifted in a direction which is indicated by an arrow A5 and is opposite from the direction indicated by the arrow A4. A line D11 indicates an average for a distribution of a change in capacitance when the driving is carried out by the rows from the 1st row to the 8th row of the Hadamard matrix or the Hadamard-Walsh transform matrix. A line D12 indicates an average for a distribution of a change in capacitance when the driving is carried out by the rows from the 9th row to the 16th row of the Hadamard matrix or the Hadamard-Walsh transform matrix. A line D13 indicates an average for a distribution of a change in capacitance when the driving is carried out by the rows from the 17th row to the 24th row of the Hadamard matrix or the Hadamard-Walsh transform matrix. A line D14 indicates an average for a distribution of a change in capacitance when the driving is carried out by the rows from the 25th row to the 32nd row of the Hadamard matrix or the Hadamard-Walsh transform matrix.

In a case where the capacitance distribution changes as described above, when the driving is carried out in accordance with the Hadamard matrix created by Sylvester method shown in (a) of FIG. 7, a capacitance distribution shown by a line D15 of the graph of (b) of FIG. 9 is obtained by horizontally reversing a capacitance distribution shown by the line 9 of the graph of (b) of FIG. 8.

Meanwhile, when the drive lines are driven in accordance with the Hadamard-Walsh transform matrix M2 shown in (b) of FIG. 7, a capacitance distribution shown by a line D16 of (c) of FIG. 9 is obtained by horizontally reversing a capacitance distribution shown by the line D10 of the graph of (c) of FIG. 8.

Figure 10:
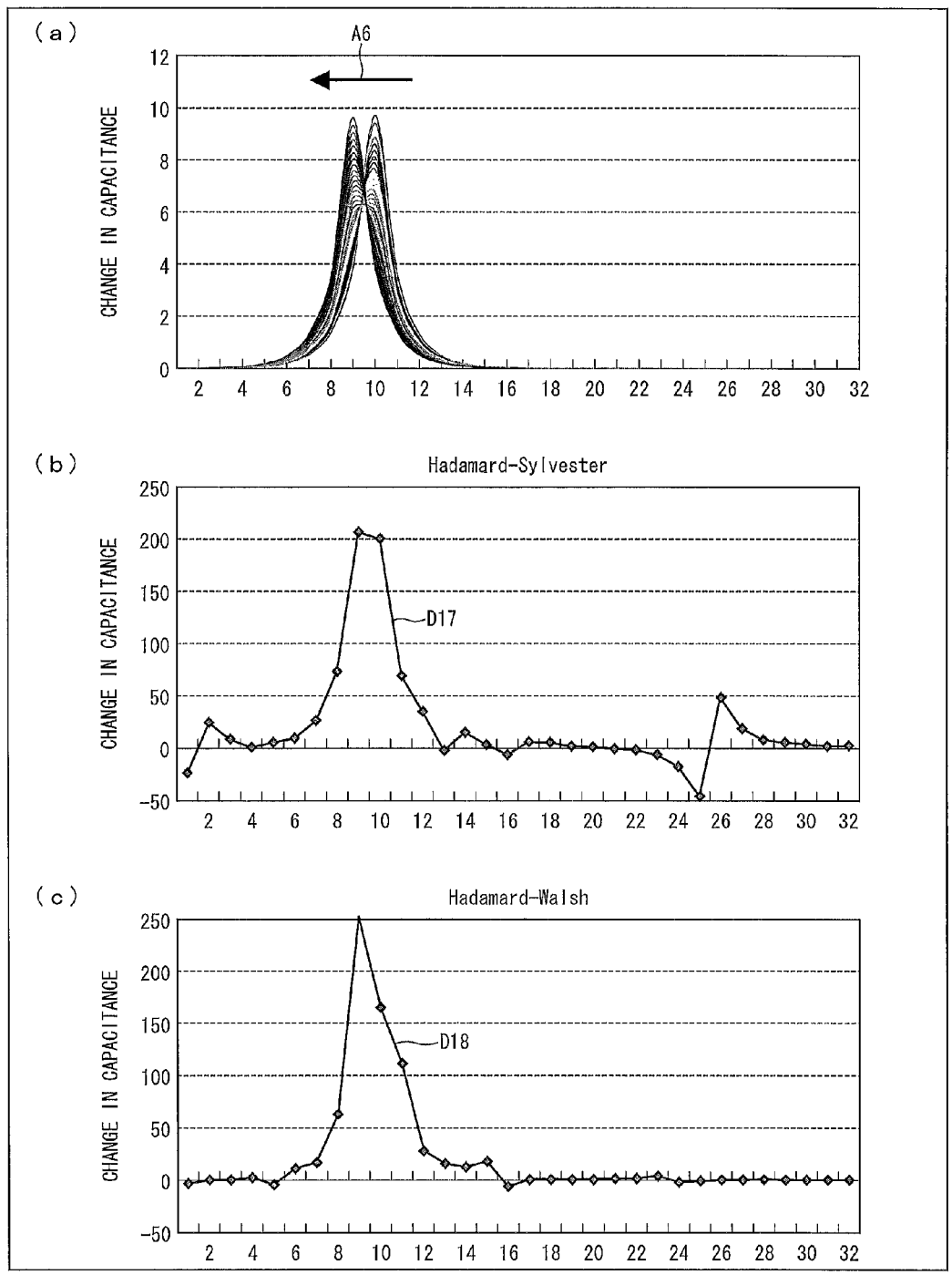
Figure 11:
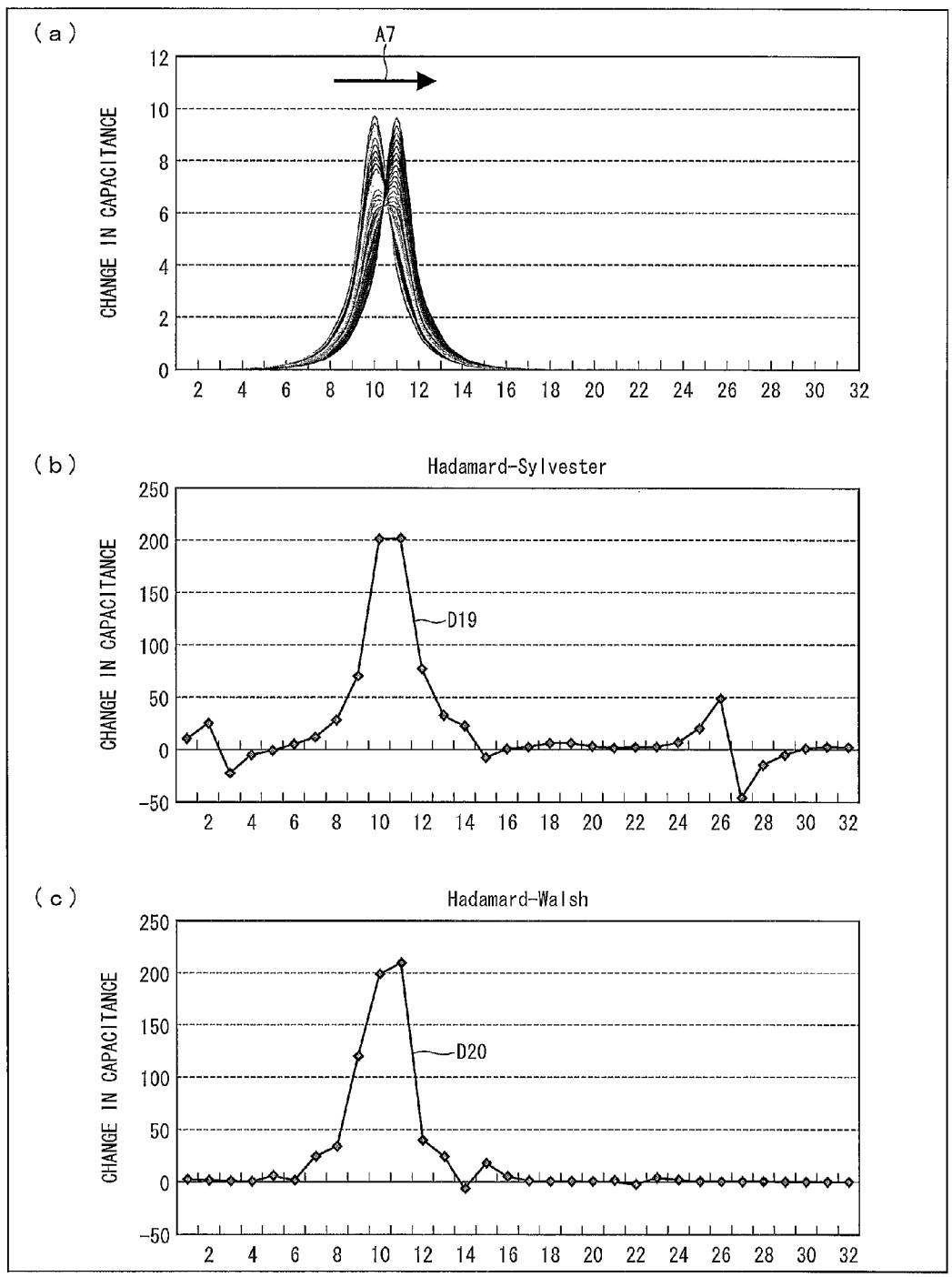

(a) of FIG. 10 is a graph showing a change in capacitance distribution to be estimated by the touch panel system 1. (b) of FIG. 10 is a graph showing an experimental result which is obtained by estimating the capacitance distribution in accordance with the Hadamard matrix created by Sylvester method. (c) of FIG. 10 is a graph showing an experimental result which is obtained by estimating the capacitance distribution in accordance with the Hadamard-Walsh transform matrix. (a) of FIG. 11 is a graph showing another change in capacitance distribution to be estimated by the touch panel system 1. (b) of FIG. 11 is a graph showing an experimental result which is obtained by estimating the capacitance distribution in accordance with the Hadamard matrix created by Sylvester method. (c) of FIG. 11 is a graph showing an experimental result which is obtained by estimating the capacitance distribution in accordance with the Hadamard-Walsh transform matrix.

In (a) of FIG. 10, a capacitance distribution obtained by driving the drive lines 32 times in accordance with an Hadamard matrix with 32 rows and 32 columns is shown by respective 32 lines. The capacitance distribution is gradually shifted during a period between the 1st driving and the 32nd driving in a direction indicated by an arrow A6. Capacitors are actually provided discretely. For example, in a case where a finger is located so as to correspond to a capacitor, a capacitance distribution has one peak at a location thereon which corresponds to a location at which the capacitor corresponds to the finger. In a case where the finger is located between two capacitors which are provided discretely so as to be adjacent to each other, two peaks appear so as to be dispersed at locations on the capacitance distribution which locations correspond to locations at which the two capacitors are adjacent to each other. As described above, the experiment was carried out with use of a configuration which is actually assumed.

In a case where the driving is carried out in accordance with the Hadamard matrix M1 created by Sylvester method shown in (a) of FIG. 7, as shown by a line D17 of the graph of (b) of FIG. 10, a large peak appears at a location on the line D17 which location is determined by averaging the capacitance distributions shown in (a) of FIG. 10, and some irregularities (false peaks) also appear at both ends of the line D17.

In a case where the drive lines are driven in accordance with the Hadamard-Walsh transform matrix M2 shown in (b) of FIG. 7, as shown by a line D18 of (c) of FIG. 10, a large peak appears at a location on the line D18 which location is determined by averaging the capacitance distributions shown in (a) of FIG. 10, and small irregularities appear near the large peak. However, no large irregularities (false peaks) appear on the line D18.

In a case where an input is carried out with respect to the touch panel with use of a fine pen, there is a problem such that a small change in capacitance due to the fine pen is hidden in the false peaks at the both ends of the capacitance distribution estimated in accordance with the Hadamard matrix M1 created by Sylvester method shown in (b) of FIG. 10.

In (a) of FIG. 11, a capacitance distribution obtained by driving the drive lines 32 times in accordance with the Hadamard matrix with 32 rows and 32 columns is shown by respective 32 lines. The capacitance distribution is gradually shifted during a period between the 1st driving and the 32nd driving in a direction which is indicated by an arrow A7 and is opposite from the direction indicated by an arrow A6. In a case where the capacitance distribution changes in the opposite direction as described above, when the driving is carried out in accordance with the Hadamard matrix M1 created by Sylvester method shown in (a) of FIG. 7, a capacitance distribution shown by a line D19 of the graph of (b) of FIG. 11 is obtained by horizontally reversing a capacitance distribution shown by the line D17 of the graph of (b) of FIG. 10.

Meanwhile, when the drive lines are driven in accordance with the Hadamard-Walsh transform matrix M2 shown in (b) of FIG. 7, a capacitance distribution shown by a line D20 of (c) of FIG. 11 is obtained by horizontally reversing a capacitance distribution shown by the line D18 of the graph of (c) of FIG. 10.

The inventors of the present invention focused on the fact that, in a case where the capacitance distribution changes in a reverse direction (see (a) of FIG. 10 and (a) of FIG. 11), false noises also occur at a reverse location (see (b) of FIG. 10 and (b) of FIG. 11). Furthermore, the inventors of the present invention found that, in a case where driving is carried out in accordance with the orthogonal code sequence in a reverse order when the capacitance distribution changes in an identical direction, an effect identical to that obtained in the case where the capacitance distribution changes in a reverse direction is supposed to be obtained. For example, it is considered that a location at which false noises occur in a case where the drive lines are driven, in accordance with the Hadamard matrix M1 created by Sylvester method shown in FIG. 7 (a), from a direction indicated by an arrow A3 is horizontally reversed to a location at which false noises occur in a case where the drive lines are driven, in accordance with the Hadamard matrix M1 created by Sylvester method shown in FIG. 7 (a), from a direction indicated by an arrow A2.

Figure 12:
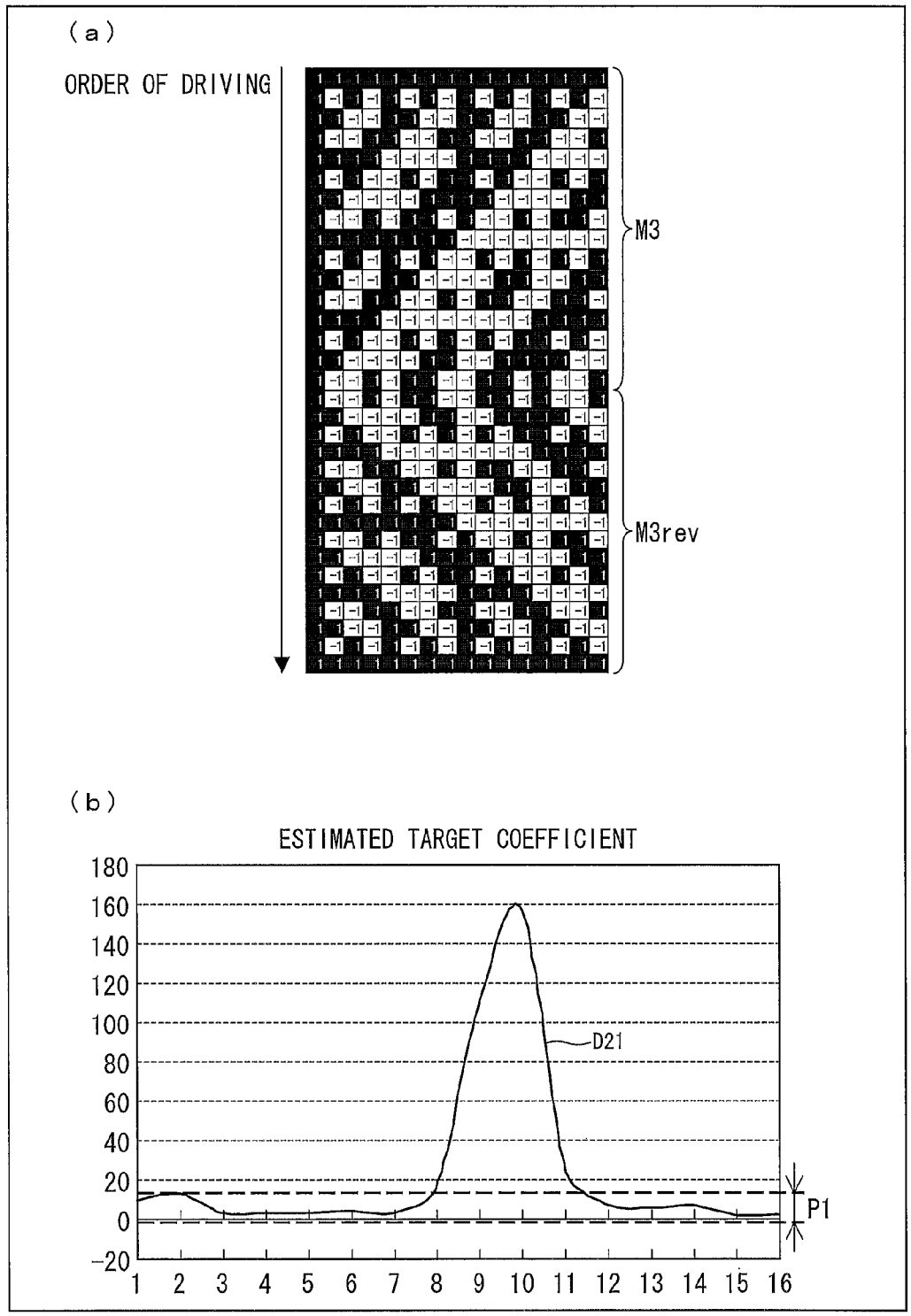
Figure 13:
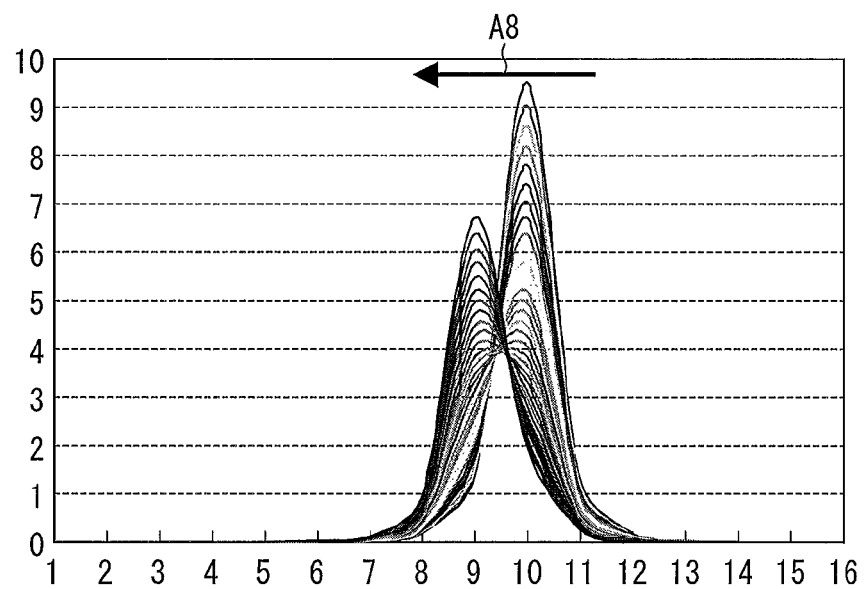

(a) of FIG. 12 is a view showing a driving method in which an order of driving in accordance with the orthogonal code sequence of Embodiment 1 is reversed at the time of the 2nd driving. (b) of FIG. 12 is a graph showing a result of estimation of the capacitance distribution in accordance with driving by the driving method. FIG. 13 is a graph showing a temporal change in capacitance distribution to be estimated by the touch panel system 1.

In (a) of FIG. 12, a capacitance distribution obtained by driving the drive lines 16 times in accordance with an Hadamard matrix with 16 rows and 16 columns is shown by respective 16 lines. The capacitance distribution is gradually shifted during a period between the 1st driving and the 16th driving in a direction indicated by an arrow A8.

First, in accordance with an order (first order) starting from the 1st row and ending at the 16th row of an Hadamard matrix M3 having 16 rows and 16 columns and created by Sylvester method, the driving section 4 (see FIG. 6) drives, in parallel 16 times, drive lines DL1 through DL16 with which respective capacitors C1 through C16 are connected. Then, the amplifying section 6 amplifies 16 first linear sum outputs of the respective capacitors C1 through C16 which outputs are supplied from the sense line SL. Next, the estimating section 5 estimates a first estimated value of capacitances of the capacitors C1 through C16 based on an inner product operation carried out with respect to (i) the 16 first linear sum outputs amplified by the amplifying section 6 and (ii) the Hadamard matrix M3 with 16 rows and 16 columns. Note that this corresponds to a case where M=16 in a configuration shown in FIG. 6.

Thereafter, in accordance with an Hadamard matrix M3rev in which rows from the 1st row to the 16th row of the Hadamard matrix M3 are rearranged in a reverse order (second order), the driving section 4 drives, in parallel 16 times, the drive lines DL1 through DL16 with which the respective capacitors C1 through C16 are connected. Then, the amplifying section 6 amplifies 16 second linear sum outputs of the respective capacitors C1 through C16 which outputs are supplied from the sense line SL. Next, the estimating section 5 estimates a second estimated value of the capacitors C1 through C16 based on an inner product operation carried out with respect to (i) the 16 second linear sum outputs amplified by the amplifying section 6 and (ii) the Hadamard matrix M3rev with 16 rows and 16 columns. Thereafter, an averaging section 17 averages the first estimated value and the second estimated value so as to estimate 16 capacitance values.

(a) of FIG. 14 is a view showing another driving method in accordance with an orthogonal code sequence. (b) of FIG. 14 is a graph showing a result of estimation of the capacitance distribution in accordance with driving by the another driving method. An amplitude P1 of false peaks in the capacitance distribution which is shown by a line D21 of (b) of FIG. 12 and is obtained in a case where the drive lines are driven in accordance with the Hadamard matrices M3 and M3rev is smaller than an amplitude P2 of false peaks in the capacitance distribution which is shown by a line D22 of (b) of FIG. 14 and is obtained in a case where driving in accordance with the Hadamard matrix M3 having 16 rows and 16 columns and created by Sylvester method is repeated two times and then results obtained by carrying out the driving two times are averaged (see (a) of FIG. 14).

As described above, driving in accordance with the orthogonal code sequence in a reverse order causes locations of the false peaks in the capacitance distribution to be approximately horizontally reversed. Therefore, in a case where the estimated values obtained by reversing the order of driving are added and averaged every time, it is possible to offset and reduce the false peaks in the capacitance distribution.

Figure 15:
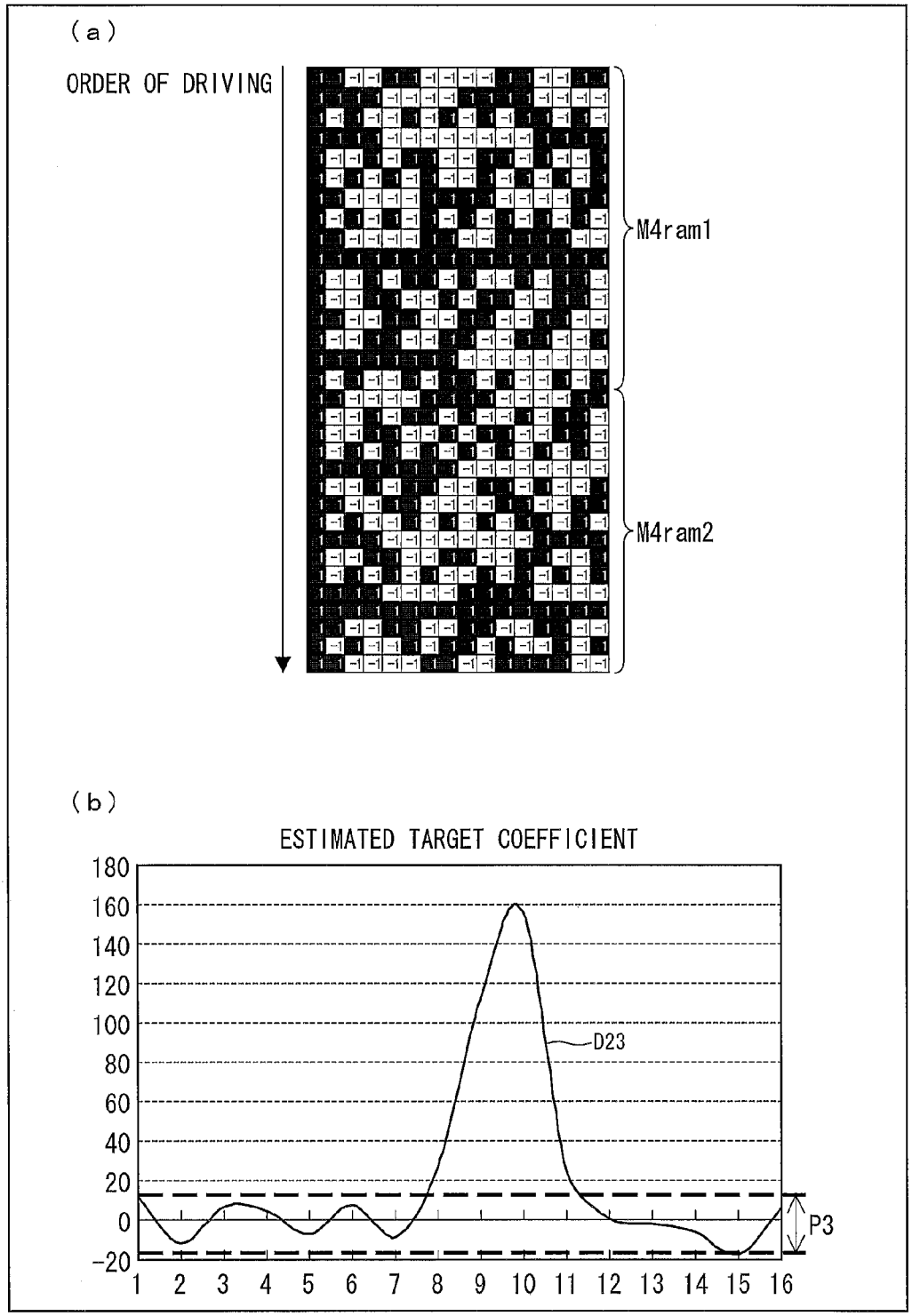

(a) of FIG. 15 is a view showing a driving method in which the order of driving in accordance with the orthogonal code sequence of Embodiment 1 is changed at random. (b) of FIG. 15 is a graph showing a result of estimation of the capacitance distribution in accordance with driving by the driving method.

First, in accordance with a matrix M4ram1 in which the rows from the 1st row to the 16th row of the Hadamard matrix M3 having 16 rows and 16 columns and created by Sylvester method are rearranged in a random order (first order), the driving section 4 (see FIG. 6) drives, in parallel 16 times, the drive lines DL1 through DL16 with which the respective capacitors C1 through C16 are connected. Then, the amplifying section 6 amplifies 16 first linear sum outputs of the capacitors C1 through C16 which outputs are supplied from the sense line SL. Next, the estimating section 5 estimates a first estimated value of capacitances of the capacitors C1 through C16 based on an inner product operation carried out with respect to (i) the 16 first linear sum outputs amplified by the amplifying section 6 and (ii) the matrix M4ram1 with 16 rows and 16 columns.

Thereafter, in accordance with another matrix M4ram2 in which the rows from the 1st row to the 16th row of the Hadamard matrix M3 are rearranged in another random order (second order), the driving section 4 drives, in parallel 16 times, the drive lines DL1 through DL16 with which the respective capacitors C1 through C16 are connected. Then, the amplifying section 6 amplifies 16 second linear sum outputs of the capacitors C1 through C16 which outputs are supplied from the sense line SL. Next, the estimating section 5 estimates a second estimated value of the capacitors C1 through C16 based on an inner product operation carried out with respect to (i) the 16 second linear sum outputs amplified by the amplifying section 6 and (ii) the Hadamard matrix M4ram2 with 16 rows and 16 columns. Thereafter, the averaging section 17 averages the first estimated value and the second estimated value so as to estimate 16 capacitance values.

As shown in (b) of FIG. 15, an amplitude P3 of false peaks in the capacitance distribution which is shown by a line D23 of (b) of FIG. 15 and is obtained in a case where the drive lines are driven in accordance with the matrices M4ram1 and M4ram2 in each of which the rows are randomly rearranged is smaller than the amplitude P2 of the false peaks in the capacitance distribution shown by the line D22 of (b) of FIG. 14.

As described above, driving carried out by randomly changing the order of driving causes noises to occur at dispersed locations. In a case where averaging is carried out, the amplitude of the false peaks can be reduced.

Embodiment 2

Figure 17:
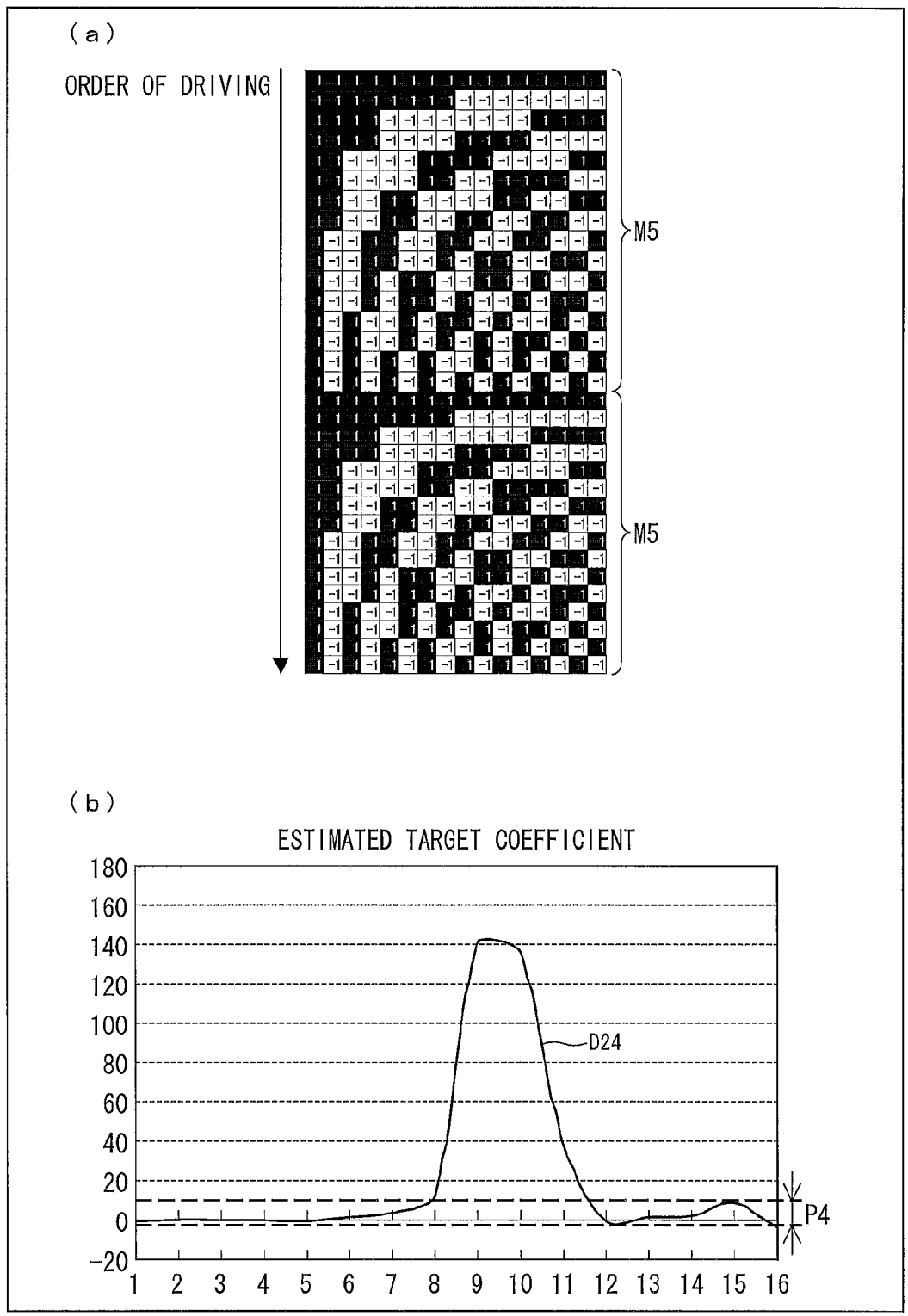

FIG. 16 is a view for explaining properties of an orthogonal code sequence of Embodiment 2. FIG. 17 is a view for explaining a driving method in accordance with an Hadamard-Walsh transform matrix of Embodiment 2. (b) of FIG. 17 is a graph showing a result of estimation of a capacitance distribution in accordance with driving by the driving method. A touch panel system of Embodiment 2 is identical to the touch panel system 1 described in FIG. 6.

According to Embodiment 2, drive lines are driven in accordance with a matrix in which the orthogonal code sequence is rearranged in an order of a spatial frequency. The orthogonal code sequence used in Embodiment 2 contains N M-dimensional vectors (N≤M) which are orthogonal to each other. The N M-dimensional vectors, each of which contains M elements arranged in a transverse direction, are arranged in a longitudinal direction.

Furthermore, the N M-dimensional vectors are arranged so that a value obtained by adding (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction monotonously changes in the longitudinal direction.

The following discusses a meaning of "a value obtained by adding (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction (hereinafter referred to as "increase/decrease addition value"). In a case where an eight-dimensional vector "0, 1, 1, 0, 1, 1, 0, 1" is taken as an example, an element of the eight-dimensional vector increases from the first element "0" to the second element "1" and decreases from the third element "1" to the fourth element "0" (see FIG. 16). Accordingly, the element increases and then decreases in the elements from the first element to the fourth element "0, 1, 1, 0". Further, the element decreases from the third element "1" to the fourth element "0" and increases from the fourth element "0" to the fifth element "1". Accordingly, the element decreases and then increases in the elements from the third element from the fifth element "1, 0, 1". Next, the element increases from the fourth element "0" to the fifth element "1" and decreases from the sixth element "1" to the seventh element "0". Accordingly, the element increases and then decreases in the elements from the fourth element to the seventh element "0, 1, 1, 0". Further, the element decreases from the sixth element "1" to the seventh element "0" and increases from the seventh element "0" to the eighth element "1". Accordingly, the element decreases and then increases in the elements from the sixth element from the eighth element "1, 0, 1".

Therefore, the increase/decrease addition value of the eight-dimensional vector "0, 1, 1, 0, 1, 1, 0, 1" is four.

An example of the orthogonal code sequence used in Embodiment 2 is typified by the Hadamard-Walsh transform matrix. In the Hadamard-Walsh transform matrix M5 having 16 rows and 16 columns and shown in (a) of FIG. 17, all elements of the 1st row are "1" and the increase/decrease addition value is accordingly zero. The 2nd row has the first eight elements that are "1" and the remaining eight elements that are "−1". Accordingly, the increase/decrease addition value is zero.

The 3rd row has the first four elements that are "1", the next eight elements that are "−1", and the next four elements that are "1". Accordingly, the increase/decrease addition value is one.

The 4th row has the first 4 elements that are "1", the next four elements that are "−1", the next four elements that are "1", and the remaining four elements that are "−1". Accordingly, the increase/decrease addition value is two. The 5th row has the first two elements that are "1", the next four elements that are "−1", the next four elements that are "1", and the next four elements that are "−1", and the remaining two elements that are "1". Accordingly, the increase/decrease addition value is three.

As described above, the increase/decrease addition value for the elements of each row of the Hadamard-Walsh transform matrix with 16 rows and 16 columns increases by one for each row from the 3rd row. The last 16th row has eight odd-numbered elements that are "1" and eight even-numbered elements that are "−1". Accordingly, the increase/decrease addition value is 14.

As has been described, the Hadamard-Walsh transform matrix M5 having 16 rows and 16 columns and shown in (a) of FIG. 17 is arranged such that the increase/decrease addition value obtained in the transverse direction for 16 elements of a vector in each row monotonously increases in the longitudinal direction.

The touch panel system 1 carries out driving two times in accordance with the Hadamard-Walsh transform matrix M5 with 16 rows and 16 columns. First, in accordance with the Hadamard-Walsh transform matrix M5 with 16 rows and 16 columns, the driving section 4 (see FIG. 6) drives, in parallel 16 times, the drive lines DL1 through DL16 with which the respective capacitors C1 through C16 are connected. Then, the amplifying section 6 amplifies 16 first linear sum outputs of the capacitors C1 through C16 which outputs are supplied from the sense line SL. Next, the estimating section 5 estimates a first estimated value of capacitances of the capacitors C1 through C16 based on an inner product operation carried out with respect to (i) the 16 first linear sum outputs amplified by the amplifying section 6 and (ii) the Hadamard-Walsh transform matrix M5 with 16 rows and 16 columns.

Thereafter, in accordance with the Hadamard-Walsh transform matrix M5, the driving section 4 drives, in parallel 16 times, the drive lines DL1 through DL16 with which the respective capacitors C1 through C16 are connected. Then, the amplifying section 6 amplifies 16 second linear sum outputs of the capacitors C1 through C16 which outputs are supplied from the sense line SL. Next, the estimating section 5 estimates a second estimated value of the capacitors C1 through C16 based on an inner product operation carried out with respect to (i) the 16 second linear sum outputs amplified by the amplifying section 6 and (ii) the Hadamard-Walsh transform matrix M5. Thereafter, the averaging section 17 averages the first estimated value and the second estimated value so as to estimate 16 capacitance values (a monotonous change estimating step).

An amplitude P4 of false peaks in the capacitance distribution which is shown by a line D24 of (b) of FIG. 17 and is obtained in a case where the drive lines are driven in accordance with the Hadamard-Walsh transform matrix M5 is smaller than the amplitude P2 of the false peaks in the capacitance distribution shown by the line D22 of (b) of FIG. 14.

FIG. 18 is a view for explaining a driving method in accordance with a DCT matrix M6 with 8 rows and 8 columns of Embodiment 2. As in the case of the Hadamard-Walsh transform matrix, the DCT matrix M6 also corresponds to a matrix which contains N M-dimensional vectors that are arranged so that an increase/decrease addition value of M elements of each of the N M-dimensional vectors monotonously increases in the longitudinal direction. The DCT matrix M6 can be used as an orthogonal code sequence of Embodiment 3.

First, in accordance with the DCT matrix M6 with 8 rows and 8 columns, the driving section 4 (see FIG. 6) drives, in parallel eight times, the drive lines DL1 through DL8 with which the respective capacitors C1 through C8 are connected. Then, the amplifying section 6 amplifies eight first linear sum outputs of the capacitors C1 through C8 which outputs are supplied from the sense line SL. Next, the estimating section 5 estimates a first estimated value of capacitances of the capacitors C1 through C8 based on an inner product operation carried out with respect to (i) the eight first linear sum outputs amplified by the amplifying section 6 and (ii) the DCT matrix M6 with 8 rows and 8 columns.

Thereafter, in accordance with the DCT matrix M6, the driving section 4 drives, in parallel eight times, the drive lines DL1 through DL8 with which the respective capacitors C1 through C8 are connected. Then, the amplifying section 6 amplifies eight second linear sum outputs of the capacitors C1 through C8 which outputs are supplied from the sense line SL. Next, the estimating section 5 estimates a second estimated value of the capacitors C1 through C8 based on an inner product operation carried out with respect to (i) the eight second linear sum outputs amplified by the amplifying section 6 and (ii) the DCT matrix M6. Thereafter, the averaging section 17 averages the first estimated value and the second estimated value so as to estimate eight capacitance values C1 through C8.

Note that the above description has taken, as an example, a case of the DCT matrix M6 with 8 rows and 8 columns. However, the present invention is not limited to this. For example, the present invention can also be configured to use a submatrix of the DCT matrix M6 with 8 rows and K columns (K<8).

Figure 19:
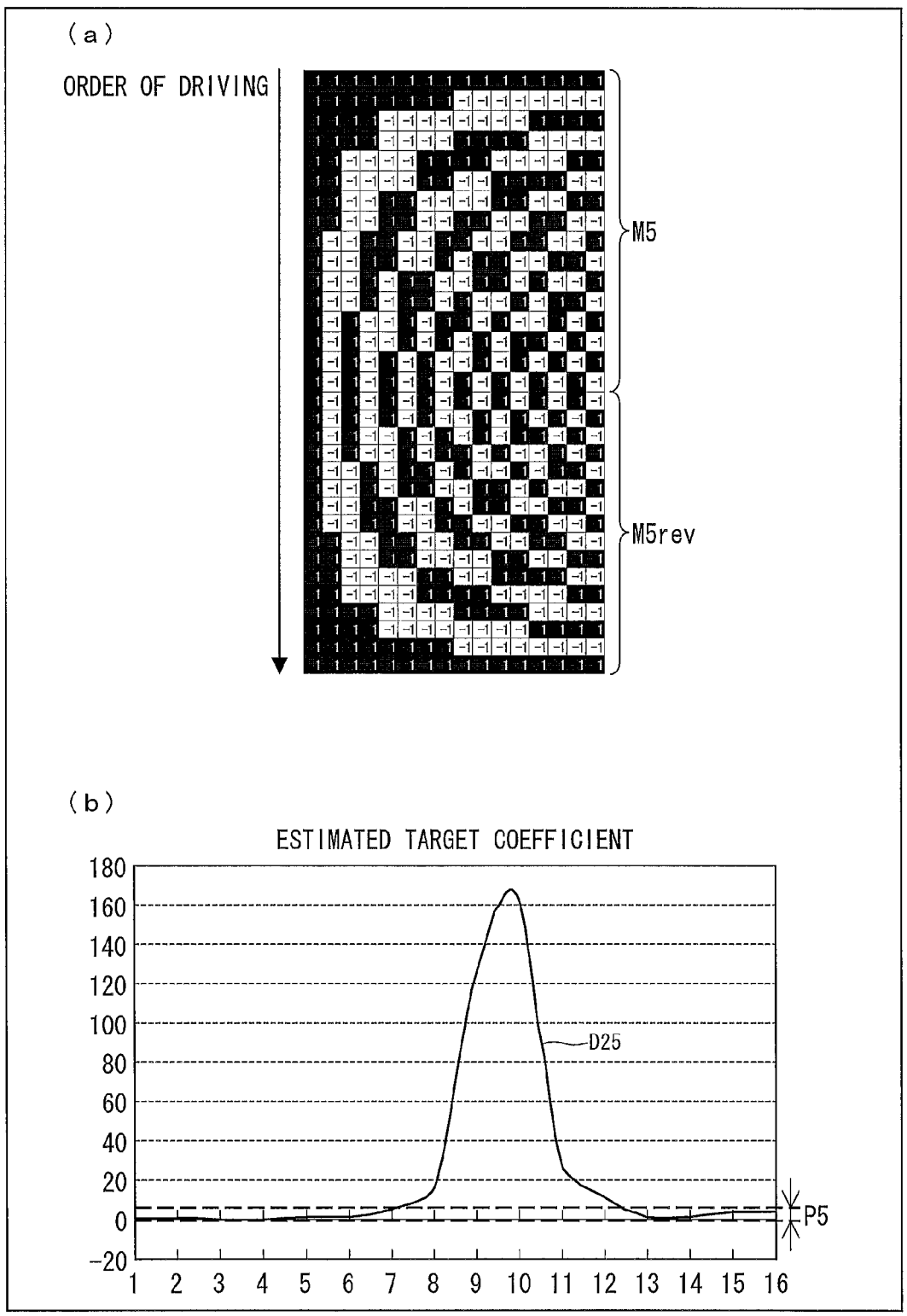

(a) of FIG. 19 is a view showing a driving method in which an order of driving in accordance with the Hadamard-Walsh transform matrix of Embodiment 2 is reversed at the time of the 2nd driving. (b) of FIG. 19 is a graph showing a result of estimation of the capacitance distribution in accordance with driving by the driving method.

As in the case of the driving method of Embodiment 1, the driving method of Embodiment 2 can be carried out by reversing, at the time of the 2nd driving, the order of driving in accordance with the Hadamard-Walsh transform matrix.

First, in accordance with the Hadamard-Walsh transform matrix M5 with 16 rows and 16 columns, the driving section 4 (see FIG. 6) drives in parallel 16 times, the drive lines DL1 through DL16 with which the capacitors C1 through C16 are connected. Then, the amplifying section 6 amplifies 16 first linear sum outputs of the capacitors C1 through C16 which outputs are supplied from the sense line SL. Next, the estimating section 5 estimates a first estimated value of the capacitors C1 through C16 based on an inner product operation carried out with respect to (i) the 16 first linear sum outputs amplified by the amplifying section 6 and (ii) the Hadamard-Walsh transform matrix M5 with 16 rows and 16 columns.

Thereafter, in accordance with an Hadamard matrix M5rev in which the rows from the 1st row to the 16th row of the Hadamard-Walsh transform matrix M5 are rearranged in a reverse order, the driving section 4 drives, in parallel 16 times, the drive lines DL1 through DL16 with which the respective capacitors C1 through C16 are connected. Then, the amplifying section 6 amplifies 16 second linear sum outputs of the capacitors C1 through C16 which outputs are supplied from the sense line SL. Next, the estimating section 5 estimates a second estimated value of the capacitors C1 through C16 based on an inner product operation carried out with respect to (i) the 16 second linear sum outputs amplified by the amplifying section 6 and (ii) the Hadamard matrix M5rev with 16 rows and 16 columns. Thereafter, an averaging section 17 averages the first estimated value and the second estimated value so as to estimate 16 capacitance values.

An amplitude P5 of false peaks in the capacitance distribution which is shown by a line D25 of (b) of FIG. 19 and is obtained in a case where the drive lines are driven in accordance with the Hadamard-Walsh transform matrices M5 and M5rev is still smaller than the amplitude P4 of the false peaks in the capacitance distribution which is shown by the line D24 of (b) of FIG. 17 and is obtained in a case where the drive lines are driven in accordance with the Hadamard-Walsh transform matrix M5.

Note that the above description has taken, as an example, a case of the Hadamard-Walsh transform matrix M5 with 16 rows and 16 columns. However, the present invention is not limited to this. For example, the present invention can also be configured to use a submatrix of the Hadamard-Walsh transform matrix M5 with 16 rows and K columns (K<16).

Embodiment 3

Figure 20:
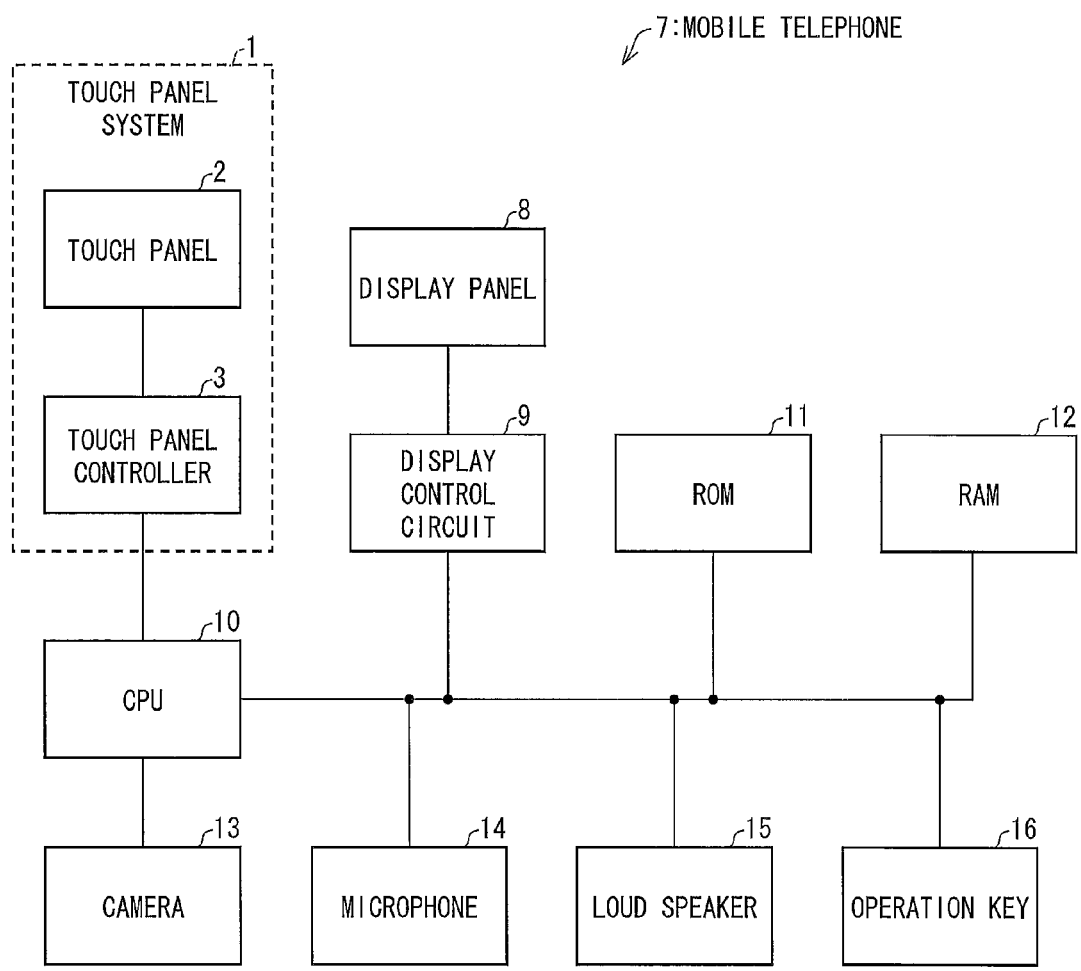
FIG. 20 is a functional block diagram illustrating a configuration of a mobile telephone of Embodiment 3.
Figure 21:
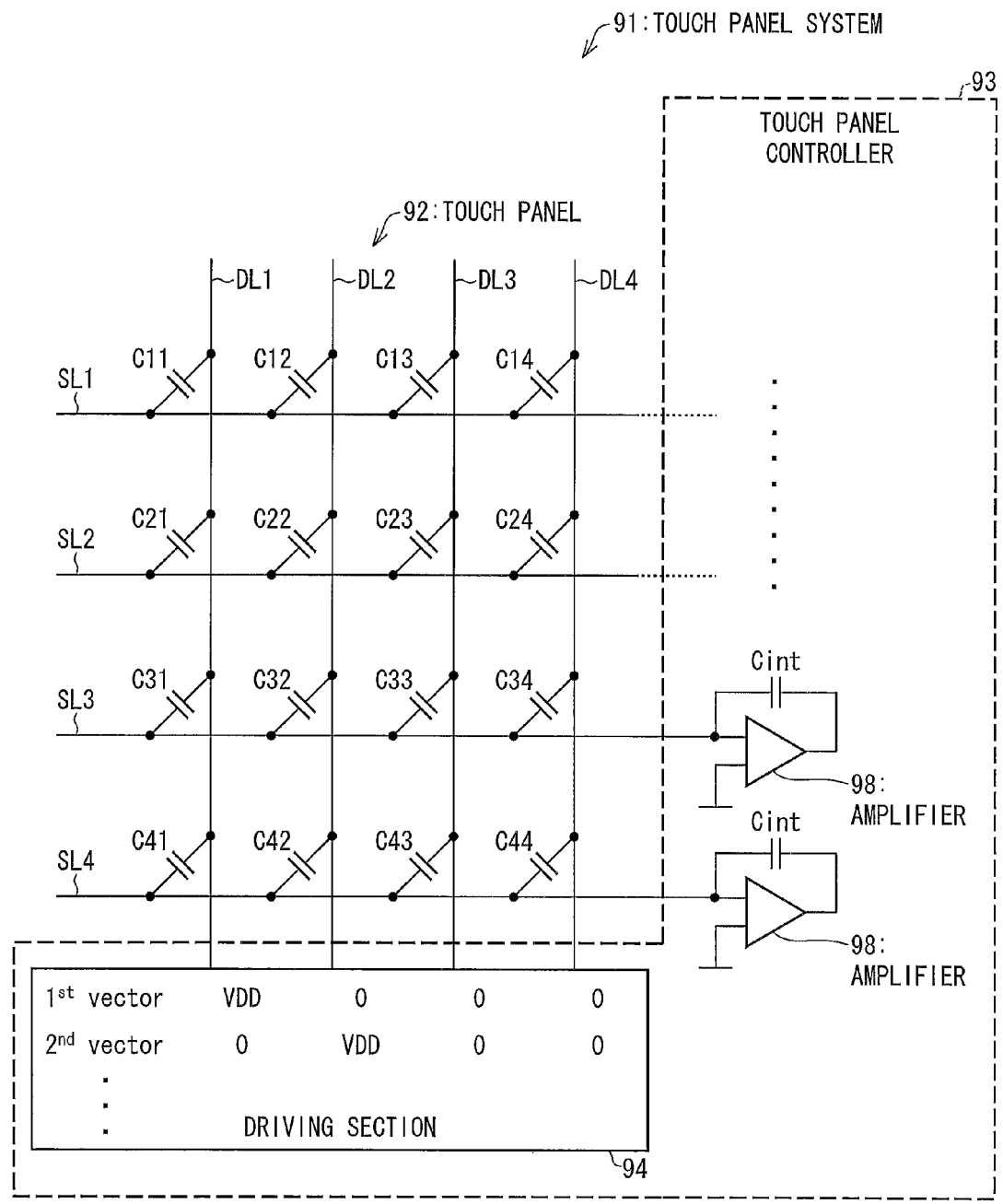
FIG. 21 is a view schematically illustrating a configuration of a conventional touch panel system.

FIG. 20 is a functional block diagram illustrating a configuration of a mobile telephone 7 of Embodiment 3. The mobile telephone 7 includes: a CPU 10; a RAM 12; a ROM 11; a camera 13; a microphone 14; a loud speaker 15; operation keys 16; a display panel 18; a display control circuit 9; and a touch panel system 1. The above constituents are interconnected via a data bus.

The CPU 10 controls operation of the mobile telephone 7. The CPU 10, for example, executes a program stored in the ROM 11. The operation keys 16 receive an input of an instruction by a user of the mobile telephone 7. The RAM 12 stores, in a volatile manner, data generated by execution of a program by the CPU 10 or data inputted with use of the operation keys 16. The ROM 11 stores data in a nonvolatile manner.

The ROM 11 is a writable, erasable ROM such as EPROM (Erasable Programmable Read-Only Memory) and a flash memory. The mobile telephone 7 can further include an interface (IF; not shown in FIG. 20) for connecting to another electronic device by wire.

The camera 13 photographs an object in response to an operation of the operation keys 16 by the user. Image data of the object thus photographed is stored in the RAM 12 or an external memory (for example, a memory card). The microphone 14 receives a speech input from the user. The mobile telephone 7 digitizes the speech input (analog data), and can transmit the digitized speech input to a communication target (for example, another mobile telephone). The loud speaker 15 outputs, for example, sound based on data such as music data stored in the RAM 12.

The touch panel system 1 includes a touch panel 2 and a touch panel controller 3. The CPU 10 controls operation of the touch panel system 1. The CPU 10, for example, executes a program stored in the ROM 11. The RAM 12 stores, in a volatile manner, data generated by execution of a program by the CPU 10. The ROM 11 stores data in a nonvolatile manner.

The display panel 8 displays, as controlled by the display control circuit 9, an image stored in the ROM 11 or RAM 12. The display panel 8 either is placed on the touch panel 2 or contains the touch panel 2.

Furthermore, the present invention can be described as below.

The linear system coefficient estimating method of each of the embodiments of the present invention is preferably configured such that the second order is an order in which the N M-dimensional vectors arranged in the first order are reversely rearranged.

According to the configuration, (i) the first estimated value obtained in accordance with the first order and (ii) the second estimated value obtained in accordance with the second order in which the N M-dimensional vectors arranged in the first order are reversely rearranged are added and averaged. Therefore, it is possible to reduce false peaks that are different from proper peaks of a capacitance distribution and appear when the values of the M target coefficients change during a period in which the N linear sums of the M target coefficients are found.

The linear system coefficient estimating method of each of the embodiments of the present invention is preferably configured such that the second order is an order in which the N M-dimensional vectors arranged in the first order are randomly rearranged.

According to the configuration, (i) the first estimated value obtained in accordance with the first order and (ii) the second estimated value obtained in accordance with the second order in which the N M-dimensional vectors arranged in the first order are randomly rearranged are added and averaged. Therefore, it is possible to disperse false peaks that are different from proper peaks of a capacitance distribution and appear when the values of the M target coefficients change during a period in which the N linear sums of the M target coefficients are found.

The linear system coefficient estimating method of each of the embodiments of the present invention is preferably configured such that the N M-dimensional vectors constitute an Hadamard-Walsh transform matrix.

According to the configuration, the Hadamard-Walsh transform matrix can be obtained in a case where the Hadamard matrix created by Sylvester method is rearranged so that the elements are arranged in an order of a frequency which increases and decreases in the transverse direction. Therefore, such a simple configuration makes it possible to reduce false peaks that are different from proper peaks of a capacitance distribution and appear when the values of the target coefficients change during a period in which the N linear sums of the target coefficients are found.

The linear system coefficient estimating method of each of the embodiments of the present invention is preferably configured such that the N M-dimensional vectors constitute Discrete Cosine Transform (DCT).

The Discrete Cosine Transform is supposed to be a matrix in which the elements are arranged in an order of a frequency which increases and decreases in the transverse direction. Therefore, such a simple configuration makes it possible to reduce false peaks that are different from proper peaks of a capacitance distribution and appear when the values of the target coefficients change during a period in which the N linear sums of the target coefficients are found.

The linear system coefficient estimating method of each of the embodiments of the present invention is preferably configured such that the N M-dimensional vectors constitute a submatrix of the Hadamard-Walsh transform matrix.

The Hadamard-Walsh transform matrix, which is a square matrix, is applied to the N M-dimensional vectors (N=M). Alternatively, in a case where the N M-dimensional vectors constitute a submatrix of the Hadamard-Walsh transform matrix, the submatrix of the Hadamard-Walsh transform matrix is applicable to N M-dimensional vectors (N≠M).

The linear system coefficient estimating method of each of the embodiments of the present invention is preferably configured such that the N M-dimensional vectors constitute a submatrix of the Discrete Cosine Transform.

In a case where the N M-dimensional vectors constitute a submatrix of the Discrete Cosine Transform, the submatrix of the Discrete Cosine Transform is applicable to N M-dimensional vectors (N≠M).

The linear system coefficient estimating method of each of the embodiments of the present invention is preferably configured such that the monotonous change estimating step includes: a first estimating step of estimating a first estimated value of the M target coefficients by driving the M target coefficients in parallel in a first order of the N M-dimensional vectors; a second estimating step of estimating a second estimated value of the M target coefficients by driving the M target coefficients in parallel in a second order of the N M-dimensional vectors in which second order the N M-dimensional vectors arranged in the first order are reversely rearranged; and an averaging step of estimating the values of the M target coefficients by averaging the first estimated value and the second estimated value.

According to the configuration, results of estimation of capacitances are added and averaged by reversing a direction of scanning for each time. Therefore, it is possible to reduce false peaks that are different from proper peaks of a capacitance distribution.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is usable for a linear system coefficient estimating method, an integrated circuit, and an electronic device each of which estimates or detects capacitance values of matrix-formed capacitors by driving drive lines in accordance with a plurality of code sequences.

REFERENCE SIGNS LIST

1: Touch panel system
2: Touch panel
3: Touch panel controller
4: Driving section
5: Estimating section
6: Amplifier
7: Mobile telephone
$C_1, C_2, C_3, \ldots, C_M$: Capacitor (target coefficient)

The invention claimed is:

1. A capacitance estimating method in which N linear sums of M capacitors provided at intersections of sense lines and M drive lines are obtained by driving the M capacitors in parallel in accordance with voltages which constitute N M-dimensional vectors and values of the M capacitors are estimated based on an inner product operation carried out with respect to (i) the N linear sums of the M capacitors and (ii) M N-dimensional vectors, the M N-dimensional vectors being vectors which make it possible to obtain, as a result of an inner product operation carried out with respect to the M N-dimensional vectors and the N M-dimensional vectors, a matrix which is a square matrix with M rows and M columns and in which an absolute value of a diagonal element is relatively larger than an absolute value of a non-diagonal element, said capacitance estimating method comprising:

a first estimating step of estimating a first estimated value of the M capacitors by driving the M capacitors in parallel in accordance with a first matrix in which the N M-dimensional vectors are arranged in a first order;

a second estimating step of estimating a second estimated value of the M capacitors by driving the M capacitors in parallel in accordance with a second matrix in which the N M-dimensional vectors are arranged in a second order that is different from the first order; and an averaging step of estimating the values of the M capacitors by averaging the first estimated value and the second estimated value.

2. The capacitance method as set forth in claim 1, wherein the second order is an order in which the N M-dimensional vectors arranged in the first order are reversely rearranged.

3. The capacitance estimating method as set forth in claim 1, wherein the second order is an order in which the N M-dimensional vectors arranged in the first order are randomly rearranged.

4. A capacitance estimating method in which N linear sums of M capacitors provided at intersections of sense lines and M drive lines are obtained by driving the M capacitors in parallel in accordance with voltages which constitute N M-dimensional vectors and values of the M capacitors are estimated based on an inner product operation carried out with respect to (i) the N linear sums of the M capacitors and (ii) the M N-dimensional vectors, the M N-dimensional vectors being vectors which make it possible to obtain, as a result of an inner product operation carried out with respect to the M N-dimensional vectors and the N M-dimensional vectors, a matrix which is a square matrix with M rows and M columns and in which an absolute value of a diagonal element is relatively larger than an absolute value of a non-diagonal element, the N M-dimensional vectors each containing M elements which are arranged in a transverse direction, the N M-dimensional vectors being arranged in a longitudinal direction, the N M-dimensional vectors being arranged so that a value obtained by adding (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction monotonously changes in the longitudinal direction, said capacitance estimating method comprising a monotonous change estimating step of estimating the values of the M capacitors by driving the M capacitors in parallel in an order of the N M-dimensional vectors arranged in the longitudinal direction.

5. The capacitance estimating method as set forth in claim 4, wherein the N M-dimensional vectors constitute an Hadamard-Walsh transform matrix.

6. The capacitance estimating method as set forth in claim 4, wherein the N M-dimensional vectors constitute Discrete Cosine Transform (DCT).

7. The capacitance estimating method as set forth in claim 4, wherein the N M-dimensional vectors constitute a submatrix of the Hadamard-Walsh transform matrix.

8. The capacitance estimating method as set forth in claim 4, wherein the N M-dimensional vectors constitute a submatrix of the Discrete Cosine Transform.

9. The capacitance estimating method as set forth in claim 4, wherein:

the monotonous change estimating step includes:

a first estimating step of estimating a first estimated value of the M capacitors by driving the M capacitors in parallel in a first order of the N M-dimensional vectors;

a second estimating step of estimating a second estimated value of the M capacitors by driving the M capacitors in parallel in a second order of the N M-dimensional vectors in which second order the N M-dimensional vectors arranged in the first order are reversely rearranged; and an averaging step of estimating the values of the M capacitors by averaging the first estimated value and the second estimated value.

10. An intergrated circuit comprising:

a driving section which drives, in parallel in accordance with voltages which constitute N M-dimensional vectors, M capacitors provided at intersections of sense lines and M drive lines; and estimating section which obtains N linear sums of the M capacitors in accordance with the driving in parallel by the driving section and estimates values of the M capacitors based on an inner product operation carried out with respect to (i) the N linear sums of the M capacitors and (ii) the M N-dimensional vectors, the M N-dimensional vectors being vectors which make it possible to obtain, as a result of an inner product operation carried out with respect to the M N-dimensional vectors and the N M-dimensional vectors, a matrix which is a square matrix with M rows and M columns and in which an absolute value of a diagonal element is relatively larger than an absolute value of a non-diagonal element, the N M-dimensional vectors each containing M elements which are arranged in a transverse direction, the N M-dimensional vectors being arranged in a longitudinal direction, the N M-dimensional vectors being arranged so that (a) the number of times of a change in the M elements of each of the N M-dimensional vectors from an increase to a decrease in value in the transverse direction and (b) the number of times of a change in the M elements of each of the N M-dimensional vectors from the decrease to the increase in value in the transverse direction monotonously changes in the longitudinal direction, and the estimating section estimating the values of the M capacitors by driving the M capacitors in parallel in an order of the N M-dimensional vectors arranged in the longitudinal direction.

11. An electronic device comprising:

an integrated circuit recited in claim 10;

touch panel which is controlled by the integrated circuit; and a display panel which is placed on the touch panel or contains the touch panel.

* * * * *